US010375122B2

(12) United States Patent
Miyamoto et al.

(10) Patent No.: US 10,375,122 B2
(45) Date of Patent: Aug. 6, 2019

(54) CONTROL APPARATUS, COMMUNICATIONS CONTROL SYSTEM, AND NON-TRANSITORY RECORDING MEDIUM THAT STORES PROGRAM

(71) Applicants: Atsushi Miyamoto, Kanagawa (JP); Hiroshi Hinohara, Kanagawa (JP); Takeshi Horiuchi, Tokyo (JP); Takuya Soneda, Kanagawa (JP); Naoki Umehara, Kanagawa (JP)

(72) Inventors: Atsushi Miyamoto, Kanagawa (JP); Hiroshi Hinohara, Kanagawa (JP); Takeshi Horiuchi, Tokyo (JP); Takuya Soneda, Kanagawa (JP); Naoki Umehara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 130 days.

(21) Appl. No.: 15/249,569

(22) Filed: Aug. 29, 2016

(65) Prior Publication Data

US 2017/0063939 A1 Mar. 2, 2017

(30) Foreign Application Priority Data

Sep. 1, 2015 (JP) ................................ 2015-172162

(51) Int. Cl.
*H04L 29/06* (2006.01)

(52) U.S. Cl.
CPC ...... *H04L 65/1046* (2013.01); *H04L 65/1069* (2013.01)

(58) Field of Classification Search
CPC ....................... H04L 65/1046; H04L 65/1069
USPC ......................................................... 709/206
See application file for complete search history.

(56) References Cited

U.S. PATENT DOCUMENTS 7,424,526 B1 * 9/2008 Hansen ............... H04L 12/2856 370/232
9,100,542 B2 8/2015 Umehara et al.
9,232,184 B2 1/2016 Maeda et al.
2006/0020694 A1 * 1/2006 Nag ................. H04L 29/06027 709/223
2014/0122681 A1 * 5/2014 Imai ....................... H04L 41/04 709/223
2014/0240450 A1 * 8/2014 Morita .................. H04N 7/147 348/14.12

(Continued)

FOREIGN PATENT DOCUMENTS

JP 2012-147416 8/2012
JP 5397563 1/2014

*Primary Examiner* — Wing F Chan
*Assistant Examiner* — Leon Y Tseng
(74) *Attorney, Agent, or Firm* — IPUSA, PLLC

(57) ABSTRACT

A control apparatus includes at least one processor configured to receive a request from a first communications terminal from among a plurality of communications terminals to select one or more relay apparatuses that relay content data transmitted and received between the first communications terminal and a second communications terminal from among the communications terminals; select one or more relay apparatuses included in one or more networks usable by the first communications terminal and the second communications terminal in response to the received request; and transmit identification information of the selected one or more relay apparatuses to the first communications terminal.

11 Claims, 22 Drawing Sheets

(56) References Cited

U.S. PATENT DOCUMENTS

2014/0304764 A1* 10/2014 Banerjee ................. H04L 63/02
726/1

* cited by examiner

FIG.6A

| TERMINAL ID | PASSWORD | SERVICE ID |
|---|---|---|
| 01aa@xx.com | aaaa | VIDEO CONFERENCE |
| 01bb@xx.com | abab | VIDEO CONFERENCE, CLOUD BOARD |
| 01cc@xx.com | baba | VIDEO CONFERENCE, MESSAGE, CLOUD BOARD |
| ... | ... | ... |

FIG.6B

| TERMINAL ID | DESTINATION NAME | STATE INFORMATION | IP ADDRESS | AREA ID | RELAY APPARATUS ID |
|---|---|---|---|---|---|
| 01aa@xx.com | AA TERMINAL | NONE | 1.2.1.3 | jp01 | 001xx |
| 01bb@xx.com | BB TERMINAL | NONE | 1.2.2.3 | us01 | 001yy |
| 01cc@xx.com | CC TERMINAL | NONE | 1.3.1.3 | sg01 | 001zz |
| ... | ... | ... | ... | ... | ... |

FIG.6C

| TERMINAL ID | |
|---|---|
| COMMUNICATIONS START REQUEST SOURCE | DESTINATION |
| 01aa@xx.com | 01bb@xx.com |
| 01aa@xx.com | 01cc@xx.com |
| ... | ... |
| 01bb@xx.com | 01aa@xx.com |
| ... | ... |

FIG.6D

| SESSION ID, RELAY APPARATUS ID | TERMINAL ID OF PARTICIPATING TERMINAL |
|---|---|
| conf01, 001xx | 01aa@xx.com, 01bb@xx.com, 01cc@xx.com |
| ... | ... |

FIG.6E

| RELAY APPARATUS ID | AREA ID | URI | OPERATION STATE |
|---|---|---|---|
| 001xx | jp01 | jp01xx.com | ONLINE |
| 002xx | jp02 | jp02xx.com | OFFLINE |

FIG.6F

| TERMINAL ID | OPERATION STATE |
|---|---|
| 01aa@xx.com | ONLINE |
| 01bb@xx.com | ONLINE |
| 01cc@xx.com | ONLINE |
| ... | ... |

FIG.6G

| TERMINAL ID | RELAY APPARATUS CONNECTION ID | RELAY APPARATUS CONNECTION PASSWORD |
|---|---|---|
| 01aa@xx.com | v.01.aa | xxxx |
| ... | ... | ... |

FIG.6H

| TERMINAL ID | INTRANET RELAY APPARATUS ID |
|---|---|
| 01aa@xx.com | 001aa, 001cc |
| 01bb@xx.com | 001aa, 001dd |
| ... | ... |
| 01cc@xx.com | 001bb, 001ee |
| 01dd@xx.com | 001aa, 001dd |

FIG.6I

| RELAY APPARATUS ID | NETWORK IDENTIFIER |
|---|---|
| 001aa | INTRANET 100A |
| 001bb | INTRANET 100B |
| 001cc | INTRANET 100C |
| 001dd | INTRANET 100D |
| ... | ... |

FIG.6J

| TERMINAL ID | NETWORK IDENTIFIER |
|---|---|
| 01aa@xx.com | INTRANET 100A |
| 01bb@xx.com | INTRANET 100B |
| 01cc@xx.com | INTRANET 100C |
| 01dd@xx.com | INTRANET 100D |
| ... | ... |

CONTROL APPARATUS, COMMUNICATIONS CONTROL SYSTEM, AND NON-TRANSITORY RECORDING MEDIUM THAT STORES PROGRAM

CROSS-REFERENCE TO APPLICATIONS

The present patent application is based on and claims the benefit of priority of Japanese Priority Application No. 2015-172162, filed on Sep. 1, 2015, the entire contents of which are hereby incorporated herein by reference.

BACKGROUND

1. Technical Field

The present disclosure relates to a control apparatus, a communications control system, and a non-transitory recording medium that stores a program.

2. Description of the Related Art

Recently, a communications system such as a video conference system where a conversation or a conference is performed using the Internet, a private line, or the like, has become widespread, in response to a demand to reduce the costs or the time for persons to move. In such a communications system, when communications has started between communications terminals, content data such as image data and sound data is transmitted and received between communications terminals. Thus, a communication is implemented between the corresponding persons.

For example, in a video conference system, in order to establish a session for transmitting content data, various information concerning a communications start request, communications start authorization, and so forth, are transmitted between video conference terminals via a control apparatus that manages a video conference. The control apparatus is connected with the video conference terminals, and carries out control to establish the session based on information transmitted from the video conference terminals.

In such a video conference system, a plurality of relay apparatuses may be used to relay content data transmitted and received between video conference terminals. For transmitting and receiving content data between the video conference terminals, one or more relay apparatuses may be selected (for example, see Japanese Patent No. 5397563).

SUMMARY

According to one aspect, a control apparatus includes at least one processor configured to receive a request from a first communications terminal from among a plurality of communications terminals to select one or more relay apparatuses that relay content data transmitted and received between the first communications terminal and a second communications terminal from among the communications terminals; select one or more relay apparatuses included in one or more networks usable by the first communications terminal and the second communications terminal in response to the received request; and transmit identification information of the selected one or more relay apparatuses to the first communications terminal.

Other objects, features, and advantages will become more apparent from the following detailed description when read in conjunction with the accompanying drawings.

BRIEF DESCRIPTION OF THE DRAWINGS

FIGS. 6A-6J illustrate one example of various management tables according to the first embodiment;

DETAILED DESCRIPTION OF EMBODIMENTS

In a communications system such as the above-described video conference system, if a relay apparatus is not properly selected, content data may be transmitted through a redundant relaying route, or content data may be transmitted via an unsecured network such as the Internet. For example, a case will be assumed where there is a relay apparatus included in an intranet to which communications terminals belonging to a certain organization can access, and also, the communications terminals can use the relay apparatus. Even in such a case, another relay apparatus included in the Internet may be selected.

An embodiment of the present invention has been devised in consideration of such a situation, and an object of the embodiment is to transmit content data through a safe and proper route in a communications system.

First Embodiment

<<General Explanation of Communications System>>

Figure 1:
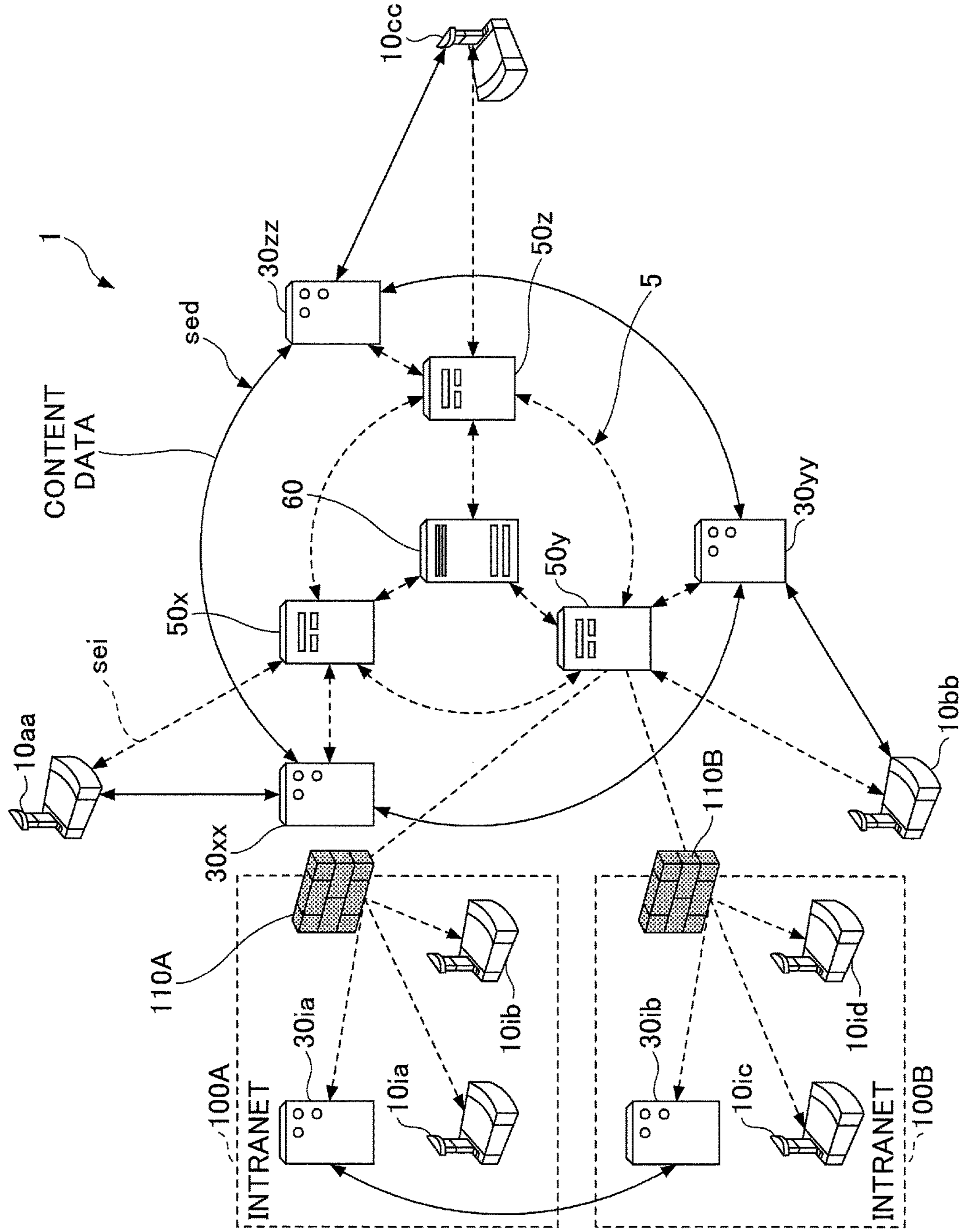
FIG. 1 is a general diagram of a communications system according to a first embodiment.

FIG. 1 is a general diagram illustrating one example of a state where various information are transmitted in a communications system according to a first embodiment. Below, communications terminals will be simply referred to as "terminals".

The communications system 1 according to the first embodiment includes a plurality of terminals (10_aa_, 10_bb_, and 10_cc_), a plurality of relay apparatuses (30_xx_, 30_yy_, and 30_zz_), and a management system 5. The management system 5 includes a plurality of control apparatuses (50_x_, 50_y_, and 50_z_), and a common management apparatus 60. Below, any terminal of the terminals (10_aa_, 10_bb_, and 10_cc_), and so forth, may be referred to as a "terminal 10". In the same way, any relay apparatus of the relay apparatuses (30_xx_, 30_yy_, and 30_zz_), and so forth, may be referred to as a "management apparatus 30". Also, any control apparatus of the control apparatuses (50_x_, 50_y_, and 50_z_), and so forth, may be referred to as a "control apparatus 50".

Each terminal 10 transmits and receives content data. One or more relay apparatuses 30 relay content data between terminals 10. Therefore, between terminals 10, one or more sessions for transmitting content data are established. Below, a session for transmitting content data will be referred to as a session "sed".

As a result of terminals 10 participating in a session sed, the terminals 10 mutually exchange content data. Thus, a communication such as a conversation between different offices, a conversation between different rooms in the same office, a conversation in the same room, a conversation between outdoor and indoor places or between different outdoor places can be implemented. Note that, if a terminal 10 is used outdoors, wireless communications using a cell phone network, or the like, may be carried out.

Thus, the communications system 1 can be a communication system. The communication system is a system for transmitting information, feelings, or the like, between communication terminals (corresponding the terminals 10) through a session established by a communication management system (corresponding to the management system 5).

Below, the communications system 1, the management system 5 and the terminals 10 will be described assuming a video conference system as one example of the communication system, assuming a video conference management system as one example of the communication management system, and assuming video conference terminals as examples of the communication terminals. That is, the terminals 10 and the management system 5 according to the first embodiment may be not only applied to a video conference system but also applied to a communication system or a communications system. That is, the communications system 1 may be a telephone system, and the terminals 10 may be IP (Internet Protocol) phones, internet phones, PCs (Personal Computers), or the like. Note that, in the first embodiment, a "video conference" may be replaced with a "TV conference".

FIG. 1 illustrates one example where the four relay apparatuses 30 relay content data between the three terminals 10. However, an actual way to transmit content data is not limited to such an example. For example, in the communications system 1, two relay apparatuses 30 may relay content data between three terminals 10, or three relay apparatuses 30 may relay content data between two terminals 10.

The common management apparatus 60 manages common information to be used by the respective control apparatuses 50 such as various information concerning terminals 10 or sessions sed between terminals 10.

A session is established between terminals 10 through control apparatuses 50 for transmitting various information. Below, such a session will be referred to as a session "sei". Various information transmitted between terminals 10 include a communications start request, information concerning communications start authorization, and a communications end request. Control apparatuses 50, can know states of terminals 10 based on various information transmitted from the terminals 10.

The communications system 1 further includes intranets (100A and 100B). Either intranet of the intranets (100A and 100B) may be referred to as an "intranet 100". An intranet 100 is connected to another network via a firewall 110. An intranet 100 is a network to which users who belong to a predetermined organization concerning the communications system 1 can access. That is, an intranet 100 is a network for which access from the outside is restricted. In many cases, an intranet 100 is built in a facility that the organization manages.

An intranet 100 may be built for each base of the organization. For example, the intranet 100A is built at a base B, and the intranet 100B is built at a base A. In this case, the intranet 100A and the intranet 100B are connected via a private line, a VPN, or the like, and content data can be transmitted and received between the intranets 100A and 100B while the security is ensured between the intranets 100A and 100B.

Content data such as video data and sound data of a video conference, or the like, is desired to be transmitted and received via intranets 100 as much as possible in consideration of the security to avoid information leakage or the like.

Also, if content data is transmitted and received via intranets 100, a route to transmit information is shorter than a case of transmitting content data via the Internet, and also, the bandwidth of transmitting content data is greater than the case of transmitting content data via the Internet. Therefore, when intranets 100 are used to transmit content data, it is possible to provide a service of a video conference to users of terminals 10 with reduced delay at high quality.

In the communications system 1 according to the first embodiment, if it is possible to use a relay apparatus 30 included in an intranet 100 to transmit content data between terminals 10, a control apparatus 50 selects the relay apparatus 30. The control apparatus 50 provides an instruction to use the selected relay apparatus 30 to transmit and receive content data, to the terminals 10.

Actually, if a control apparatus 50 receives a video conference start request from a terminal 10_ia_, the control apparatus 50 determines whether the terminal 10_ia_ that transmits the video conference start request can use a relay apparatus 30_ia_ included in the intranet 100A, and also, a terminal 10_ib_ of a destination can use the relay apparatus 30_ia_.

If the terminals 10_ia_ and 10_ib_ both can use the relay apparatus 30_ia_, the control apparatus 50 provides an instruction to use the relay apparatus 30_ia_.

Even if a plurality of terminals 10 that hold a video conference are connected to intranets 100, it may be impossible to use a relay apparatus 30 by these terminals 10 in common. That is, in many cases, intranets 100 are built at respective places such as a Japanese base and a United States base, and may be mutually connected. In such a case, a terminal 10 can use a relay apparatus 30 of a base where the terminal 10 is located. However, it may be impossible for the terminal 10 to use a relay apparatus 30 of another base.

The communications system 1 according to the first embodiment operates to select a relay apparatus 30 included in an intranet 100 as much as possible even in the above-mentioned case.

Below, an example where the terminal 10_ia_ can connect to the relay apparatus 30_ia_, which is located at the same base where the terminal 10_ia_ is located from among the relay apparatuses 30 included in the intranets 100, while the terminal 10*ib* can connect to the relay apparatus 30*ib*, will be described.

If a control apparatus 50 receives a video conference start request from the terminal 10*ia* to hold a video conference with the terminal 10*ib*, the control apparatus 50 selects the relay apparatus 30*ia* included in the intranet 100A, and the relay apparatus 30*ib* included in the intranet 100B. The control apparatus 50 provides an instruction to the terminal 10*ia* to transmit content data to and receive content data from the relay apparatus 30*ia*. Also, the control apparatus 50 provides an instruction to the terminal 10*ib* to transmit content data to and receive content data from the relay apparatus 30*ib*.

The control apparatus 50 provides instructions to the relay apparatuses 30*ia* and 30*ib* to transmit content data between the relay apparatuses 30*ia* and 30*ib*.

As a result of the control apparatus 50 operating as mentioned above, content data is transmitted within intranets 100 even if terminals 10 are placed at different bases.

Note that, when there are the intranets 100A and 100B, the communications system 1 can carry out control assuming that there are a plurality of intranets 100.

<<State Transition of Terminal>>

Figure 2:
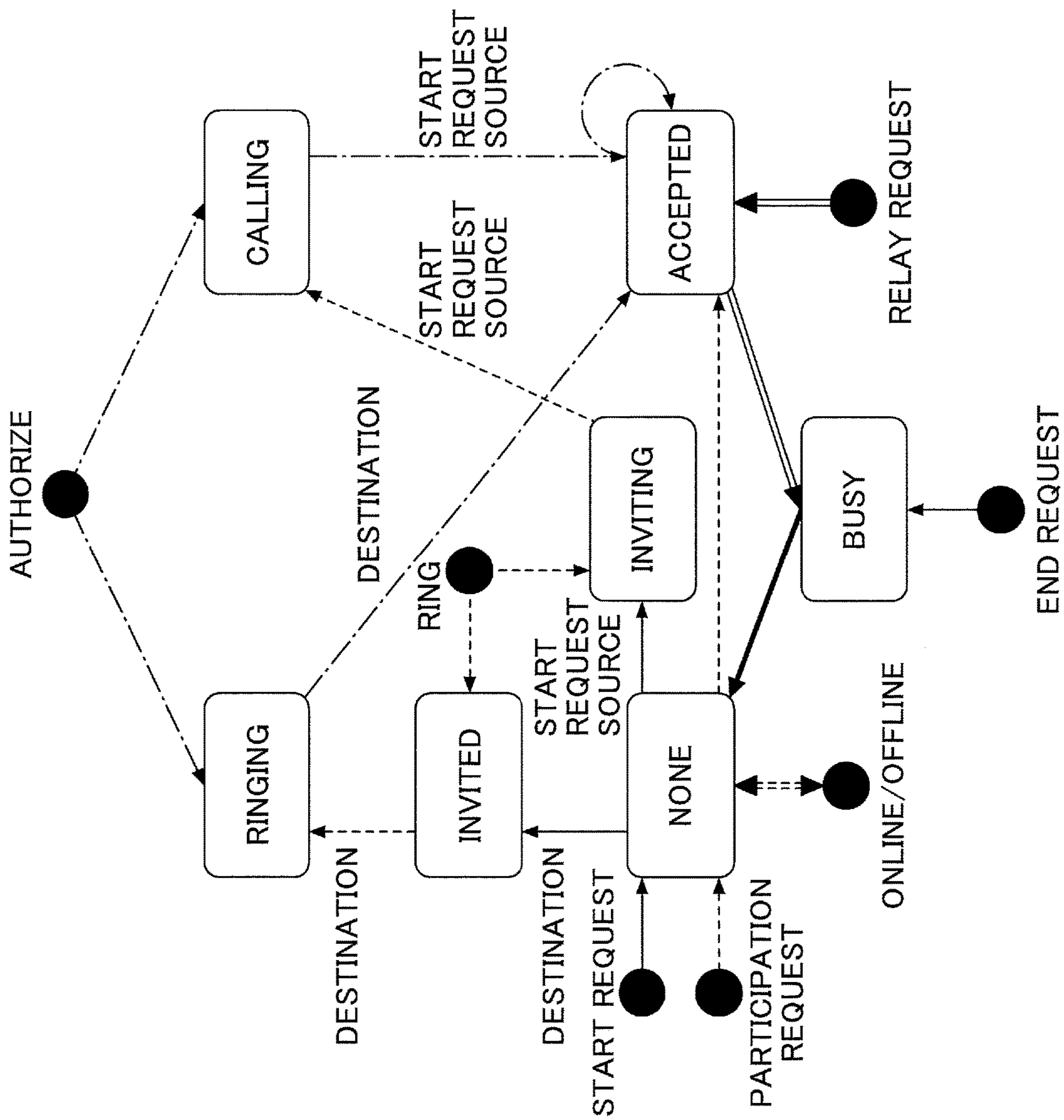
FIG. 2 illustrates one example of state transition of a terminal according to the first embodiment.

FIG. 2 illustrates one example of state transition of a terminal 10 according to the first embodiment. In the state transition diagram of FIG. 2, state information that indicates a communications state such as "none", for example, of a terminal 10 is written in each block. When a terminal 10 has logged in to a control apparatus 50 to enter an "online" state, the communications state of the terminal 10 becomes a waiting state before an actual start of communications (i.e., a state expressed as state information "none").

If the terminal 10 transmits a communications start request to start communications with another terminal 10, the communications state of the terminal 10 of the start request source becomes a state of requesting communications with the other terminal 10 (i.e., a state expressed by state information "inviting"). The communications state of the terminal 10 of the destination becomes a state of receiving a communications start request from another terminal 10 (i.e., a state expressed by state information "invited").

If the terminal 10 of the destination outputs a ring tone, the communications state of the terminal 10 of the destination becomes a state of outputting a ring tone (i.e., a state expressed by state information "ringing"). The communications state of the terminal 10 of the start request source becomes a state of outputting a dial tone (i.e., a state expressed by state information "calling").

When the terminal 10 of the destination authorizes the communications start request, the terminals 10 of the start request source and the destination both enter states where the communications start request has been authorized (state information expressed as "accepted").

If a terminal 10 transmits a relay start request to request relaying content data, the communications state of the terminal 10 becomes a state under communications (i.e., a state expressed by state information "busy").

If a terminal 10 transmits a communications end request, the communications state of the terminal 10 of the end request source returns to a state expressed by the state information "none". If a terminal 10 transmits a participation request to request to participate in an established session sed, the communications state of the terminal 10 of the participation request source becomes a state expressed by state information "accepted".

Note that, the above-described state transition rule is one example, and another rule may be adopted in the communications system 1.

A storage unit 5000 of each of the respective control apparatuses 50 stores information that indicates the state transition rule such as that illustrated in FIG. 2. For example, if the communications state of a terminal 10 of a start request source is "none" when a communications start request is transmitted from the terminal 10, the control apparatus 50 transmits the communications start request to a terminal 10 of the destination. If the communications state of the terminal 10 of the start the request source is other than "none", the control apparatus 50 denies the communications start request, for example. Thus, it is possible to properly carry out call control between the terminals 10.

Figure 3:
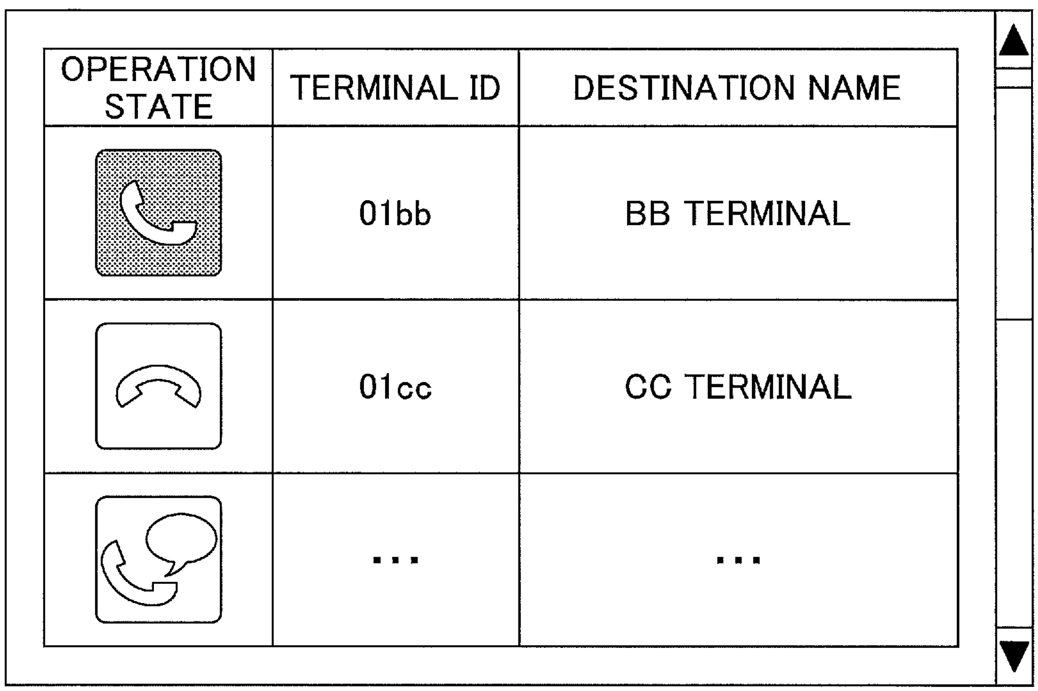
FIG. 3 illustrates one example of a destination list according to the first embodiment.

FIG. 3 illustrates one example of a destination list according to the first embodiment. Each control apparatus 50 manages an operation state (presence) of each terminal 10, for reporting the operation state to the user of the terminal 10, for example, in addition to the communications state of terminal 10. The operation states include, for example, operation states as shown below.

A state "online" indicates that a terminal 10 is connected to a control apparatus 50, but no communications is carried out with another terminal 10. A state "online (under communications)" indicates that a terminal 10 is connected to a control apparatus 50, and communications is carried out with another terminal 10. A state "offline" indicates that a terminal 10 is not connected to a control apparatus 50. Each control apparatus 50 reports the operation states of terminals 10 of destination candidates for a terminal 10, to the terminal 1 to which the control apparatus 50 itself is connected. When the terminal 10 has received the operation states from the control apparatus 50, a display control unit 17 of the terminal 10 updates icons that represent the operation states displayed in the destination list based on the received operation states. In FIG. 3, the top icon represents the operation state "online", the middle icon represents the operation state "offline", and the bottom icon represents the operation state "online (under communications)".

<<Hardware Configuration>>

(1) Hardware Configuration of Terminal

Figure 4A:
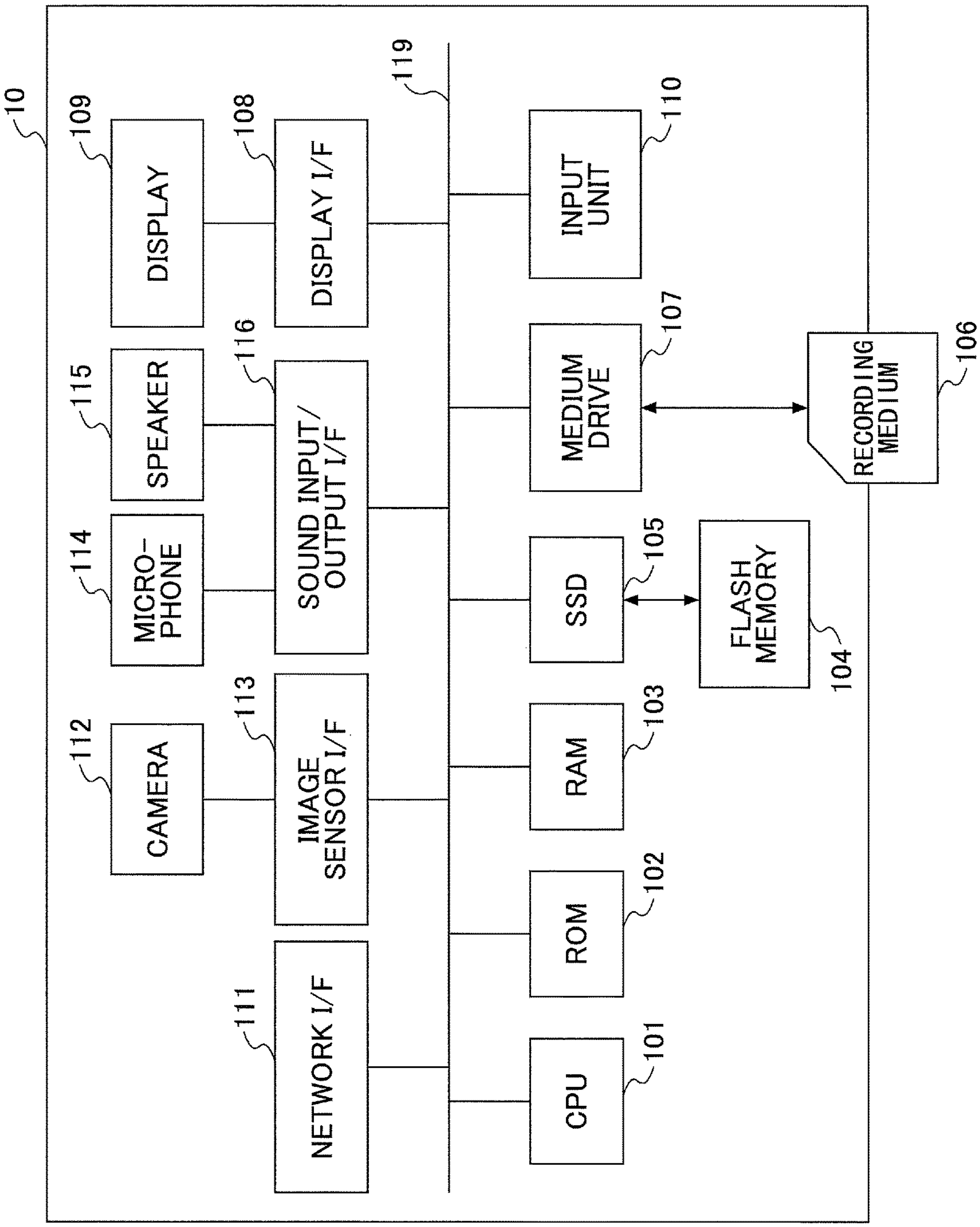
FIGS. 4A and 4B illustrate one example of a hardware configuration according to the first embodiment.

FIG. 4A illustrates one example of a hardware configuration of each terminal 10.

Each terminal includes a CPU (Central Processing Unit) 101, a ROM (Read-Only Memory) 102, a RAM (Random Access Memory) 103, a flash memory 104, and a SSD (Solid State Drive) 105. The terminal 10 also includes a medium drive 107, an input unit 110, a display I/F 108, a display 109, a network I/F 111, a camera 112, an image sensor I/F 113, a microphone 114, a speaker 115, and a sound input/output I/F 116. Further, the terminal 10 includes a bus line 119 such as an address bus, a data bus, and so forth, electrically connecting the above-mentioned respective elements.

The CPU 101 controls the entirety of the terminal 10. The ROM 102 stores programs such as an IPL (Initial Program Loader) used to start the CPU 101. The RAM 103 is used as a work area of the CPU 101.

The flash memory 104 stores various data and programs for the terminal 10. The SSD 105 controls reading various data from the flash memory 104 and writing various data to the flash memory 104 under the control of the CPU 101. The medium drive 107 controls reading data from and writing (storing) data to (in) a recording medium 106 such as a memory card.

The input unit 108 is, for example, a touch panel, a keyboard, a pointing device, or the like, to receive a user's input operation. The display I/F 108 controls the display 109 to display various information on the display 109.

The network I/F 111 is a communications interface for the terminal 10 to transmit data via a communications network. The camera 112 includes an image sensor to image a subject under the control of the CPU 101. The image sensor I/F 113 controls the camera 112 to take an image, and converts the taken image into image data. The microphone 114 converts collected sounds into an electric signal. The speaker 115 coverts a sound signal into sounds and outputs the sounds. The sound input/output I/F 116 controls input and output of sounds using the microphone 114 and the speaker 115.

Figure 4B:
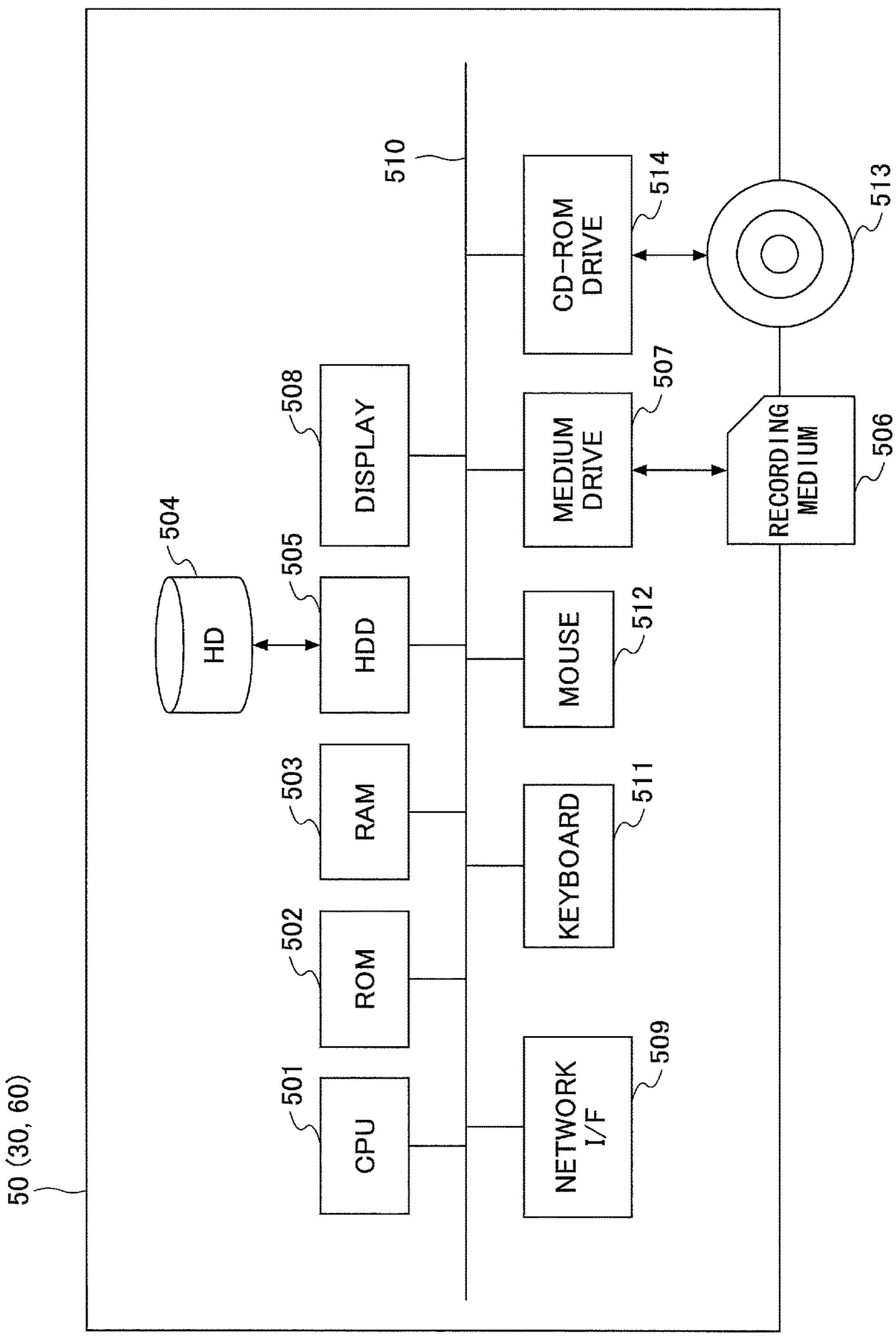

(2) Hardware Configuration of Control Apparatus, Relay Apparatus, and Common Management Apparatus FIG. 4B illustrates one example of a hardware configuration of each control apparatus 50.

Each control apparatus 50 includes a CPU 501, a ROM 502, a RAM 503, a HD (Hard Disk) 504, a HDD (Hard Disk Drive) 505, a medium drive 507, a display 508, a network I/F 509, a keyboard 511, a mouse 512, a CD-ROM (Compact Disc Read-Only Memory) drive 514, and a bus line 510 such as an address bus, a data bus, and so forth, electrically connecting the above-mentioned respective elements.

The CPU 501 controls the entirety of the control apparatus 50. The ROM 502 stores programs such as an IPL (Initial Program Loader) used to drive the CPU 501. The RAM 503 is used as a work area of the CPU 501. The HD 504 stores various data and programs for the control apparatus 50. The HDD 505 controls reading various data and programs from and writing various data and programs to the HD 504 under the control of the CPU 501. The medium drive 507 controls reading data from and writing (storing) data in a recording medium 506 such as a flash memory. The display 508 displays various information such as a cursor, a menu, a window, characters/letters, or images. The network I/F 509 carries out communications using a communications network. The key board 511 has a plurality of keys for inputting characters/letters, numerals, various instructions, and so forth. The mouse 512 is used to select or execute various instructions, select a target to be processed, move the cursor, and so forth. The CD-ROM drive 514 controls reading various data from and writing various data to a CD-ROM 513 as one example of a detachable recording medium.

Each of the relay apparatuses 30 and the common management apparatus 60 has a hardware configuration similar to the hardware configuration of the control apparatus 50, and therefore, duplicate description will be omitted.

Respective programs for the terminals 10, the relay apparatuses 30, the control apparatuses 50, and the common management apparatus 60 may be recorded in computer readable recording media in a form of an installable format or an executable format, and may be circulated. As examples of the recording media, CD-R (Compact Disc Recordable), DVD (Digital Versatile Disks), Blu-ray disks, and so forth, may be cited. Also, recording media such as CD-ROMs storing the respective programs, and the HDs 504 storing the respective programs, may be provided domestically or overseas as program products.

Also, each apparatus of the control apparatuses 50 and the common management apparatus 60 may be implemented by a single computer, or, may be implemented by a plurality of computers where each apparatus of the control apparatuses 50 and the common management apparatus 60 is divided into respective parts (functions or units) and the plurality of computes are assigned to implement the respective parts. Also, the common management apparatus 60 may be implemented in one of the control apparatuses 50.

<<Functional Configuration>>

(1) Functional Configuration of Terminal

Figure 5:
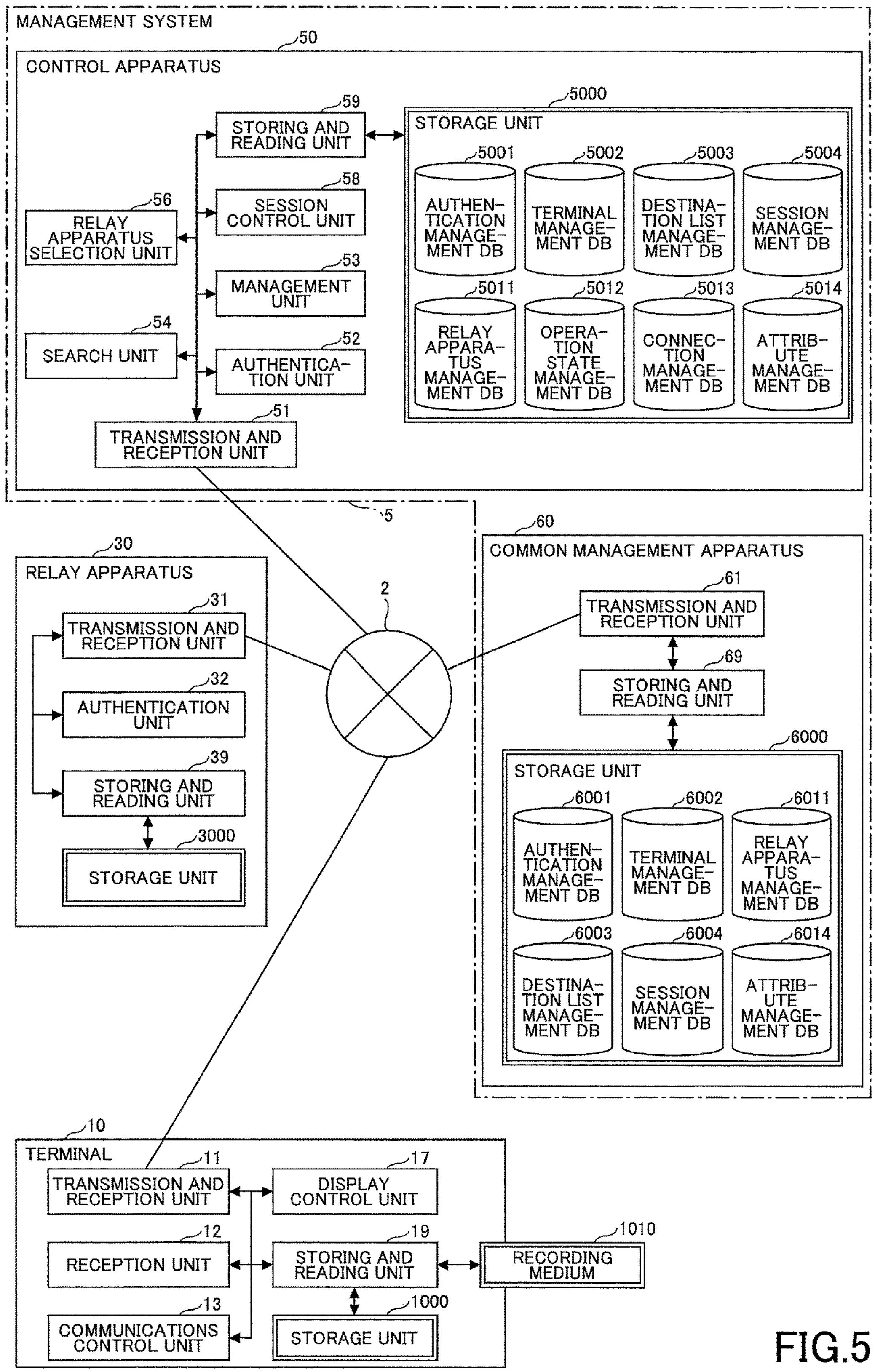
FIG. 5 illustrates a functional configuration of the communications system according to the first embodiment.

As illustrated in FIG. 5, each terminal 10 includes a transmission and reception unit 11, a reception unit 12, a communications control unit 13, a display control unit 17, and a storing and reading unit 19. These elements are functions or units implemented as a result of any ones of the elements illustrated in FIG. 4A operating according to the program for the terminal 10 written in the RAM 103 from the flash memory 104 and executed by the CPU 101. Also, each terminal 10 includes a storage unit 1000 implemented by the RAM 103 and the flash memory 104. Further, each terminal 10 has a recording medium 1010 (106) inserted into the terminal 10, and the storing and reading unit 19 reads various data from and writes various data in the recording medium 1010.

(Detailed Functional Configuration of Terminal)

Next, detailed functional configuration of each terminal 10 will be described.

The transmission and reception unit 11 is implemented by instructions from the CPU 101 and the network I/F 111, and transmits various data to and receives various data from another terminal 10 or an apparatus via a communications network 2. Actual examples of the communications network 2 include an intranet, the Internet, and so forth.

The reception unit 12 is implemented by instructions from the CPU 101, and receives various user's inputs such as operating an operation button, pressing a power switch, included in the input unit 110, and so forth. For example, if the user turns on the power switch, the reception unit 12 receives the power turning on operation, and turns on the power in the terminal 10.

The communications control unit 13 is implemented by instructions of the CPU 101, the camera 112, and the image sensor I/F 113, takes an image of a subject, and outputs image data acquired from taking the image of the subject. Also, the communications control unit 13 is implemented by instructions of the CPU 101, and the sound input/output I/F 116, and inputs sound data concerning a sound signal acquired from the user's voice through the microphone 114. Also, the communications control unit 13 is implemented by instructions from the CPU 101, and the sound input/output I/F 116, outputs a sound signal concerning sound data to the speaker 115, and thus, outputs sounds from the speaker 115.

The display control unit 17 is implemented by instructions of the CPU 101, and the display I/F 108, and carries out control to combine received image data having different resolutions, and transmit the combined image data to the display 108. The display control unit 17 is capable of transmitting information received from a control apparatus 50 to the display 109 to display the information on the display 109.

The storing and reading unit 19 is implemented by instructions of the CPU 101 and the SSD 105, or implemented by instructions from the CPU 101, stores various data in the storage unit 1000 or the recording medium 1010, and reads various data from the storage unit 1000 or the recording medium 1010. The storage unit 1000 stores a terminal ID (Identification) for identifying the terminal 10, a password, and so forth. It is also possible that at least one of the terminal ID and the password is stored in the recording medium 1010, and is read by the storing and reading unit 19. In this case, the recording medium 1010 is an IC card (Integrated Circuit card) such as a SIM card (Subscriber Identity Module Card). Then, the user of the terminal 10 can receive a service from a manager of a control apparatus 50 by buying the recording medium 1010.

Also, in the storage unit 1000, image data and sound data received when a conversation is made with a destination terminal 10 is overwritten each time when the image data and sound data is received. The overwritten image data is used to display an image on the display 109, and the overwritten sound data is used to output a sound from the speaker 115.

The terminal ID according to the first embodiment is one example of identification information such as a language, a letter/character, a sign, or any one of various marks, for uniquely identifying the terminal 10. Also, the terminal ID may be identification information acquired from combining at least two of languages, letters/characters, signs, and various marks. Also, instead of the terminal ID, a user ID for identifying the user of the terminal 10 may be used. In this case, the terminal identification information may be the terminal ID or the user ID.

(2) Functional Configuration of Control Apparatus

As illustrated in FIG. 5, each control apparatus 50 includes a transmission and reception unit 51, an authentication unit 52, a management unit 53, a search unit 54, a session control unit 58, a relay apparatus selection unit 56, and a storing and reading unit 59. These elements are functions or units implemented as a result of some of the elements illustrated in FIG. 4B operating according to the program for the control apparatus 50 written in the RAM 503 from the HD 504 and executed by the CPU 501. Also, each control apparatus 50 has a storage unit 5000 implemented by the HD 504.

The storage unit 5000 of each control apparatus 50 stores area IDs of areas (X, Y, and Z) where the control apparatuses 50 are located. For example, the storage unit 5000 stores an area ID "jp01" indicating Japan where the control apparatus 50*x* is located. The storage unit 5000 may further store an area ID "us01" indicating United States where the control apparatus 50*y* is located. The storage unit 5000 may further store an area ID "sg01" indicating Singapore where the control apparatus 50*z* is located.

Also, the storage unit 5000 stores an authentication management DB 5001 that includes an authentication management table, a terminal management DB 5002 that includes a terminal management table, a destination list management DB 5003 that includes a destination list management table, a session management DB 5004 that includes a session management table, a relay apparatus management DB 5011 that includes a relay apparatus management table, an operation state management DB 5012 that includes an operation state management table, a connection management DB 5013 that includes a connection management table, and an attribute management DB 5014 that includes attribute management table.

(Authentication Management Table)

FIG. 6A is a conceptual diagram illustrating the authentication management table. In the authentication management table, the terminal IDs for identifying the terminals 10, passwords, and service IDs of services usable by the terminals 10 are associated with each other and are managed. In the following description, the terminal IDs of the terminals 10*aa*, 10*bb*, and 10*cc* are "01aa@xx.com", "01bb@xx.com", and "01cc@xx.com", respectively. However, because "@xx.com" included in each terminal ID is common among the terminals 10, "@xx.com" may be omitted.

(Terminal Management Table)

FIG. 6B is a conceptual diagram illustrating the terminal management table. In the terminal management table, a destination name (for example, a terminal name of the terminal 10), state information indicating a communications state of the terminal 10, the IP address of the terminal 10, the area ID of a control apparatus 50 to which the terminal 10 is connected, and the relay apparatus ID of a relay apparatus 30 to which the terminal 10 is connected are associated with the terminal ID of each terminal 10, and are managed.

(Destination List Management Table)

FIG. 6C is a conceptual diagram illustrating the destination list management table. In the destination list management table, the terminal IDs of the terminals 10 of destination candidates designatable for the terminal 10 of a communications start request source are associated with the terminal ID of the terminal 10 of the communications start request source, and the respective terminals IDs are managed.

(Session Management Table)

FIG. 6D is a conceptual diagram illustrating the session management table. In the session management table, the terminal IDs of terminals 10 that are participating in a session sed are associated with a session ID for identifying the session sed, and the terminal IDs and the session IDs are managed. Note that, according to the first embodiment, concerning a session sed, when content data is transmitted between terminals 10 using a plurality of relay apparatuses 30, one of the relay apparatuses 30 manages the entirety of relaying content data. This relay apparatus 30 acts as a starting point, and provides information indicating relay destinations of content data to the other relay apparatuses 30. Therefore, the session ID includes a domain information (for example, "001xx") indicating the relay apparatus 30 as the starting point (for example, the relay apparatus 30*xx*) concerning the session sed.

(Relay Apparatus Management Table)

FIG. 6E is a conceptual diagram illustrating the relay apparatus management table. In the relay apparatus management table, the area ID of the area where the relay apparatus 30 is located, and a URI (Uniform Resource Identifier) of the relay apparatus 30 are associated with the relay apparatus ID of a relay apparatus 30, and the area IDs, the URLs, and the relay apparatus IDs are managed.

(Operation State Management Table)

FIG. 6F is a conceptual diagram illustrating the operation state management table. In the operation state management table, an operation state (presence) of the terminal 10 is associated with the terminal ID of a terminal 10, and the operation states and the terminal IDs are managed.

(Connection Management Table)

FIG. 6G is a conceptual diagram illustrating the connection management table. In the connection management table, a relay apparatus connection ID generated each time when the terminal 10 is connected with a relay apparatus 30, and a relay apparatus connection password used when the terminal 10 is connected with the relay apparatus 30 for authenticating the terminal 10 are associated with the terminal ID of a terminal 10, and the relay apparatus connection IDs, the relay apparatus connection passwords, and the terminal IDs are managed.

(Attribute Management Table)

Each control apparatus 50 stores the attribute management table. In the attribute management tables, a relay apparatus 30 usable by each terminal 10 is associated with a network identifier of a network in which the relay apparatus 30 is included, and the relay apparatuses 30 and the network identifiers are stored. If relay apparatuses 30 included in the same network are stored in the attribute management tables, for example, if relay apparatuses 30 included in a certain intranet 100 are stored and no other relay apparatuses 30 are stored in the attribute management tables, the network identifier need not be stored.

FIG. 6H is a conceptual diagram illustrating one example of the attribute management table. In the attribute management table, the relay apparatus ID of a relay apparatus 30 included in an intranet 100 usable by the terminal 10 is associated with the terminal ID of a terminal 10, and the relay apparatus IDs and the terminal IDs are managed. For example, FIG. 6H indicates that the terminal 10 having the terminal ID "01aa@xx.com" can use the relay apparatuses 30 having the relay apparatus IDs "001aa" and "001cc". It is also possible to store the network identifiers of the relay apparatuses 30 in the attribute management table.

FIGS. 6I and 6J are conceptual diagrams illustrating another example of the attribute management table.

In the attribute management table of FIG. 6I, the relay apparatus ID of a relay apparatus 30 is associated with the network identifier of the network in which the relay apparatus 30 is included, and the relay apparatus IDs and the network identifiers are stored. In the attribute management table of FIG. 6J, the terminal ID of a terminal 10 is associated with the network identifier of the network in which the terminal 10 is included, and the terminal IDs and the network identifiers are stored.

Network addresses of relay apparatuses 30 may be used as the network identifiers. The network address of each relay apparatus 30 is, for example, the network address part of the IP address of the relay apparatus 30.

(Detailed Functional Configuration of Control Apparatus)

Next, detailed functional configuration of each control apparatus 50 will be described. While the functional configuration of each control apparatus 50 will be described in detail, relationships with main elements for implementing each functional element illustrated in FIG. 5 will also be described.

The transmission and reception unit 51 is implemented by instructions from the CPU 501 and the network I/F 509, and transmits various data or information to and receives various data or information from each terminal 10 or each apparatus via the communications network 2.

The authentication unit 52 is implemented by instructions from the CPU 501, and searches the authentication management table (see FIG. 6A) using a terminal ID and a password received through the transmission and reception unit 51 as search keys, to authenticate the corresponding terminal 10 by determining whether the same terminal ID and password are managed in in the authentication management table.

The management unit 53 is implemented by instructions from the CPU 501, and manages the respective management tables by adding various information to or deleting various information from the management tables.

The search unit 54 is implemented by instructions from the CPU 501, and carries out a node search process for a terminals 10 (node) connected to another control apparatus 50.

The session control unit 58 is implemented by instructions from the CPU 501, and controls a session sed for transmitting content data between terminals 10. In detail, the session control unit 58 carries out control to establish a session sed, control to cause a terminal 10 to participate in the established session sed, and control to disconnect the session sed.

The storing and reading unit 59 is implemented by instructions from the CPU 501, and the HDD 505, or is implemented by instructions from the CPU 501, stores various data in the storage unit 5000, and reads various data from the storage unit 5000.

The relay apparatus selection unit 56 is implemented by instructions from the CPU 501, and reads the attribute management DB 5014 stored in the CPU 201 to select a relay apparatus 30.

(Linkage of Functions of Control Apparatus)

Functions of each control apparatus 50 are linked as follows.

The transmission and reception unit 51 receives, from a terminal 10, a request to select a relay apparatus 30 to be used for transmitting content data to and receiving content data from another terminal 10. The relay apparatus selection unit 56 responds to the request, to select a relay apparatus 30 included in a network usable by the terminal 10 and the other terminal. The transmission and reception unit 51 reports the identification information of the selected relay apparatus 30 to the terminal 10.

The storage unit 5000 stores information of relay apparatuses 30 that respective terminal 10 can use and the network identifiers of the networks in which the relay apparatuses 30 are included, where the relay apparatuses are associated with the network identifiers. The relay apparatus selection unit 56 may read the storage unit 5000 to select a relay apparatus 30 included in a network in which the terminal 10 and the other terminal 10 are included.

Note that, the control apparatus 50 need not include the storage unit 5000. It is sufficient that the storage unit 5000 is included in the communications system 1. If the storage unit 5000 is included in the communications system 1, the relay apparatus selection unit 56 acquires the correspondences between relay apparatuses 30 usable by respective terminals 10 and the network identifiers of the networks in which the relay apparatuses 30 are included, from the storage unit 5000 via the transmission and reception unit 51.

The relay apparatus selection unit 56 may select a plurality of relay apparatuses 30. For example, the relay apparatus selection unit 56 may select a relay apparatus 30 of the terminal 10 that has transmitted the request to select a relay apparatus 30 and a relay apparatus 30 of the other terminal 10.

Operations of selecting relay apparatuses 30 by the relay apparatus selection unit 56 will be described later.

(3) Function Configuration of Common Management Apparatus

The common management apparatus 60 has a transmission and reception unit 61 and a storing and reading unit 69. These elements are functions or units implemented as a result of some of the elements illustrated in FIG. 5 operating according to instructions of the CPU 501 that executes the program for the common management apparatus 60 written in the RAM 503 from the HD 504. Also, the common management apparatus 60 has a storage unit 6000 implemented by the HD 504. The storage unit 6000 stores an authentication management DB 6001 including a authentication management table, a terminal management DB 6002 including a terminal management table, a destination list management DB 6003 including a destination list management table, a session management DB 6004 including a session management table, a relay apparatus management DB 6011 including a relay apparatus management table, and an attribute management DB 6014 including an attribute management table. Note that, the authentication management DB 6001, the terminal management DB 6002, the destination list management DB 6003, the session management DB 6004, the relay apparatus management DB 6011, and the attribute management DB 6014 of the common management apparatus 60 are synchronized with the authentication management DB 5001, the terminal management DB 5002, the destination list management DB 5003, and the session management DB 5004, the relay apparatus management DB 5011, and the attribute management DB 5014 of the control apparatus 50, respectively, and the DBs manage the shared information, respectively.

The transmission and reception unit 61 is implemented by instructions from the CPU 501, and the network I/F 509, and transmits various data or information to and receives various data or information from the terminals 10 and the other apparatuses via the communications network 2.

The storing and reading unit 69 is implemented by instructions from the CPU 501, and the HDD 505, or is implemented by instructions from the CPU 501, stores various data in the storage unit 6000, and reads various data from the storage unit 6000.

(4) Functional Configuration of Relay Apparatus

Each relay apparatus 30 includes a transmission and reception unit 31, an authentication unit 32, and a storing and reading unit 39. These elements are functions or units implemented as a result of some of the elements illustrated in FIG. 5 operating according to instructions of the CPU 501 that executes the program for the relay apparatus 30 written in the RAM 503 from the HD 504. Also, the common management apparatus 60 has a storage unit 3000 implemented by the HD 504.

(5) Detail Function Configuration of Relay Apparatus

The transmission and reception unit 31 is implemented by instructions from the CPU 501, and the network I/F 509, and transmits various data or information to and receives various data or information from the terminals 10 and the other apparatuses via the communications network 2.

The authentication unit 32 is implemented by instructions from the CPU 501, and authenticates a terminal 10 by determining whether a combination of a terminal ID, a relay apparatus connection ID, and a relay apparatus connection password received through the transmission and reception unit 31 is managed in the connection management table (see FIG. 6G) of a control apparatus 50.

The storing and reading unit 39 is implemented by instructions from the CPU 501, and the HDD 505, or is implemented by instructions from the CPU 501, stores various data in the storage unit 3000, and reads various data from the storage unit 3000.

<<Operation Procedure>>

(1) Login Sequence

Figure 7:
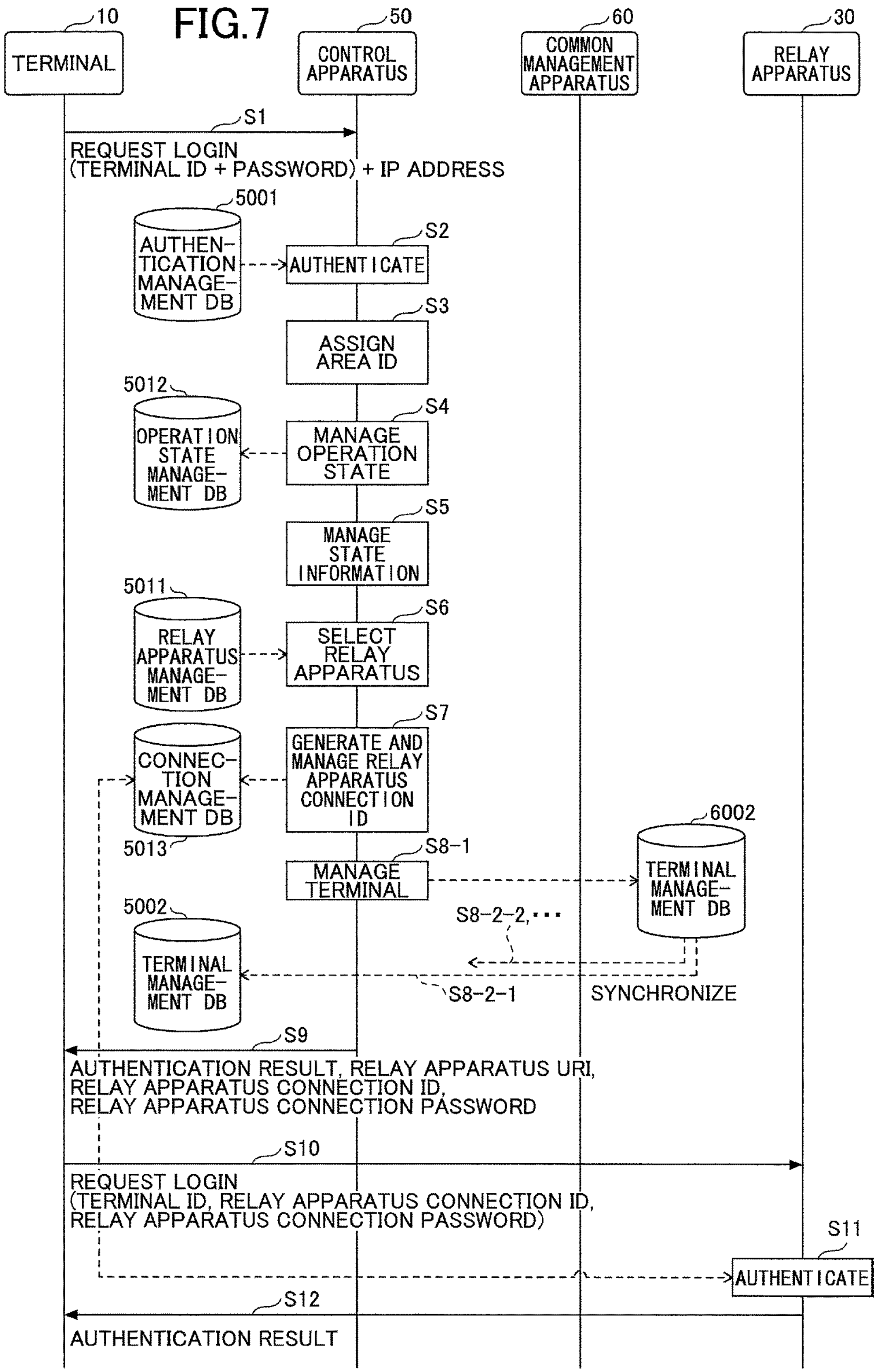
FIG. 7 is sequence diagram illustrating one example of a login process of a terminal according to the first embodiment.

A process of a terminal 10 to login to a control apparatus 50 and a relay apparatus 30 will be described. FIG. 7 is a sequence diagram illustrating one example of a login process of a terminal 10 according to the first embodiment.

According to the first embodiment, a terminal 10 can login to any one of the control apparatuses 50. A method for each terminal 10 to select a control apparatus 50 to which the terminal 10 logs in is not limited. For example, a method where a control apparatus 50 is selected based on information that is input to a terminal 10, a method where, based on the physical position of a terminal 10, the nearest control apparatus 50 is selected, and a method where GSLB (Global Server Load Balancing) technology is used to select a control apparatus 50 can be cited.

A terminal 10 transmits a login request to a selected control apparatus 50 through the transmission and reception unit 11 (step S1). The login request includes the terminal ID and the password of the terminal 10 that is the login request source. Thus, the transmission and reception unit 51 of the control apparatus 50 receives the login request that includes the terminal ID and the password, and the IP address of the terminal 10.

Then, the authentication unit 52 reads the authentication management table to authenticate the terminal 10 that is the login request source (step S2). If the same combination as the combination of the terminal ID and the password transmitted from the login request source is managed by the authentication management table, the authentication unit 52 successfully authenticates the terminal 10 that is the login request source. However, if the same combination as the combination of the terminal ID and the password transmitted from the login request source is not managed by the authentication management table, the authentication unit 52 fails in authenticating the terminal 10 that is the login request source. Below, description will be made assuming the case where the authentication is successful.

The storing and reading unit 59 searches the authentication management table to read the corresponding service ID using the terminal ID of the terminal 10 that is the login request source as a search key, also in step S2.

Then, the management unit 53 assigns an area ID that indicates the area where the control apparatus 50 itself is located to the terminal 10 that is the login request source (step S3). The area ID is previously stored in the storage unit 5000 of the control apparatus 50. For example, if the control apparatus 50 that receives the login request is the control apparatus 50*x* located in the area X (Japan), the management unit 53 assigns the area ID "jp01" to the terminal 10 that is the login request source.

Then, the storing and reading unit 59 stores the terminal ID of the terminal 10 that is the login request source and the operation state "online" in the operation state management table where the terminal ID of the terminal 10 that is the login request source is associated with the operation state "online" based on a request from the management unit (step S4).

Also, the management unit 53 manages the communications state of the terminal 10 that is the login request source according to the state transition rule indicated by the state transition diagram (step S5). That is, in step S4, in response to a fact that the operation state becomes "online", the management unit 53 determines state information that indicates a new state of the terminal 10 that is the login request source as "none".

If the service ID that is read in step S2 is "video conference", the session control unit 58 selects a relay apparatus 30 as a connection target to which the terminal 10 that is the login request source will connect from among a plurality of relay apparatuses 30 (for example, the relay apparatuses (30*xx* and 30*xy*)) located in the same area as the area (for example, the area X) of the control apparatus 50 itself (step S6). The actual method for selecting the relay apparatus 30 is not limited, and may be a round-robin method, a method of selecting a relay apparatus 30 based on the load of each relay apparatus 30, or the like. Also in step S6, the storing and reading unit 59 searches the relay apparatus management table using the relay apparatus ID of the selected relay apparatus 30 as a search key to read the corresponding URI.

Also, the session control unit 58 of the control apparatus 50 generates the relay apparatus connection ID to be used when the terminal 10 that is the login request source will connect to the relay apparatus 30 selected in step S5 (step S7). Also in step S7, the storing and reading unit 59 stores the relay apparatus connection ID and the relay apparatus connection password in the connection management table where the terminal ID of the terminal 10 that is the login request source is associated with the generated relay apparatus connection ID and the relay apparatus connection password. Note that, the relay apparatus connection password may be previously determined for each relay apparatus 30, or may be generated each time when a terminal 10 connects to a relay apparatus 30.

Also, the transmission and reception unit 51 of the control apparatus 50 transmits a terminal management table update request to the common management apparatus 60 (step S8-1). The terminal management table update request includes the terminal ID and the IP address of the terminal 10 that is the login request source, the area ID assigned in step S3, the state information determined in step S5, and the relay apparatus ID of the selected relay apparatus 30 selected in step S6. When the transmission and reception unit 61 of the common management apparatus 60 has received the terminal management table update request, the storing and reading unit 69 stores the terminal ID, the IP address, the state information, the area ID, and the relay apparatus ID in the own terminal management table where the terminal ID, the IP address, the state information, the area ID, and the relay apparatus ID included in the terminal management table update request are associated together, in the common management apparatus 60.

Thereafter, the transmission and reception unit 61 of the common management apparatus 60 transmits the update contents that include the terminal ID, the state information, the area ID, and the relay apparatus ID with which the terminal management table is to be updated, to the respective control apparatuses (50*x*, 50*y*, and 50*z*) included in the communications system 1. When the transmission and reception units 51 of the respective control apparatuses (50*x*, 50*y*, and 50*z*) have received the update contents, the storing and reading units 59 of the respective control apparatuses 50 update their own terminal management tables based on the received update contents. Thus, the terminal management tables in the respective control apparatuses (50*x*, 50*y*, and 50*z*) are synchronized with the terminal management table of the common management apparatus (steps S8-2-1, S8-2-2, . . . ).

Then, the transmission and reception unit 51 of the control apparatus 50 transmits the authentication result that the authentication is successful, the URI of the relay apparatus 30 read in step S6, and the relay apparatus connection ID and the relay apparatus connection password generated in step S6 to the terminal 10 that is the login request source (step S9).

When the transmission and reception unit 11 of the terminal 10 has received the URI, the relay apparatus connection ID, and the relay apparatus connection password transmitted from the control apparatus 50, the transmission and reception unit 11 transmits a login request to the relay apparatus 30 indicated by the URI (step S10). The login request includes the terminal ID of the terminal 10 that is the login request source, and the relay apparatus connection ID and the relay apparatus connection password transmitted from the control apparatus 50.

In the relay apparatus 30 that has received the login request, the authentication unit 32 tries to authenticate the terminal 10 that is the login request source (step S11). In this case, the authentication unit 32 queries the control apparatus 50 as to whether the same combination as the combination of the terminal ID, the relay apparatus connection ID, and the relay apparatus connection password included in the login request is managed by the connection management table of the control apparatus 50 located in the same area as the area of the relay apparatus 30 itself through the transmission and reception unit 31. In the control apparatus 50 that has received the query, the management unit 53 reads the connection management table to acquire the response to the query, and transmits the response to the relay apparatus 30 through the transmission and reception unit 51. If the same combination as the combination of the terminal ID, the relay apparatus connection ID, and the relay apparatus connection password included in the login request is managed by the connection management table of the control apparatus 50, the authentication unit 32 succeeds in authenticating the terminal 10 that is the login request source. If the same combination as the combination of the terminal ID, the relay apparatus connection ID, and the relay apparatus connection password included in the login request is not managed by the connection management table of the control apparatus 50, the authentication unit 32 fails in authenticating the terminal 10 that is the login request source. The transmission and reception unit 31 of the relay apparatus 30 transmits the authentication result to the terminal 10 that is the login request source (step S12).

(2) Destination List Request Sequence

Figure 8:
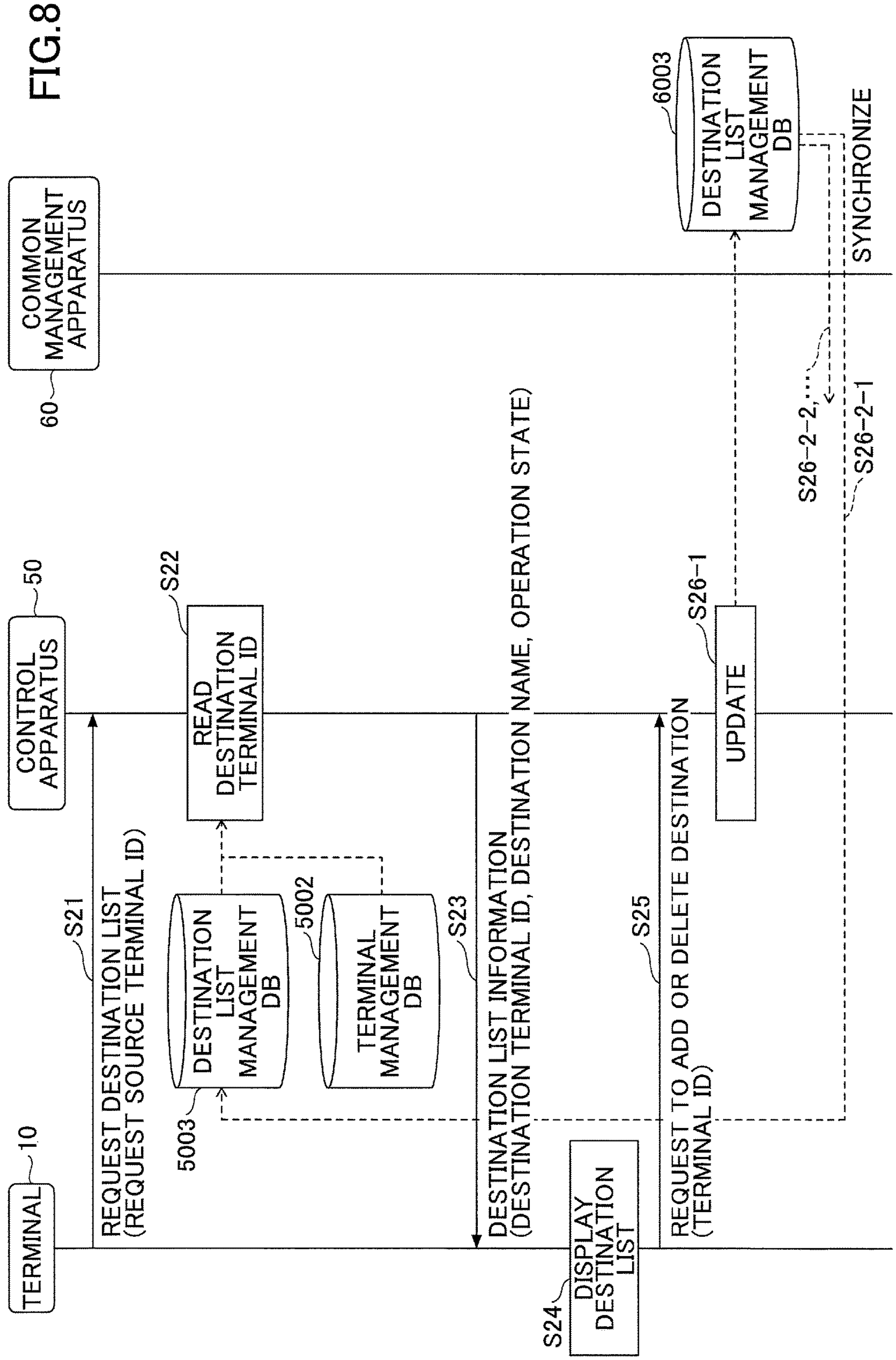
FIG. 8 is a sequence diagram illustrating one example of a process to display a destination list for a terminal according to the first embodiment.

With reference to FIG. 8, a process of a terminal 10 to display a destination list where destination candidates of the terminal 10 itself is indicated will now be described. FIG. 8 is a sequence diagram illustrating one example of a process to display a destination list for a terminal 10. When the terminal 10 has received the authentication result, the transmission and reception unit 11 transmits a destination list request that includes the terminal ID of the terminal 10 itself and requests a destination list, to the control apparatus 50 via the communications network 2 (step S21). The transmission and reception unit 51 of the control apparatus 50 receives the destination list request.

Then, the storing and reading unit 59 searches the destination list management table using the terminal ID of the terminal 10 that has requested a destination list request as a search key to extract the terminal IDs of the terminals 10 as destination candidates, which the terminal 10 that has requested a destination list can designate as a destination (step S22). Also, the storing and reading unit 59 searches the terminal management table using the extracted terminal IDs as search keys to read the corresponding destination names. The transmission and reception unit 51 of the control apparatus 50 transmits destination list information that includes the terminal IDs of the terminals 10 and the destination names of the destination candidates that have been read by the storing and reading unit 59 to the terminal 10 that has requested a destination list (step S23).

When the transmission and reception unit 11 of the terminal 10 that has requested a destination list has received the destination list information, the display control unit 17 of the terminal 10 displays a destination list where designatable destination candidate names are reflected on the display 109 based on the terminal IDs and the destination names included in the destination list information (step S24).

According to the first embodiment, in order to add a destination candidate, if any, to or delete a destination candidate, if any, from the destination list, the terminal 10 transmits a destination list management table update request that includes the terminal ID of the terminal 10 of a destination candidate to be added or deleted, and the terminal ID of the terminal 10 itself, to the control apparatus (step S25). In the control apparatus 50 that has received the destination list management table update request, the transmission and reception unit 51 transmits the destination list management table update request to the common management apparatus 60 based on a request from the management unit 53 (step S26-1). The destination list management table update request includes the terminal ID of the terminal 10 that has requested the update, and the terminal ID of the terminal 10 of the destination candidate to be added or deleted. The storing and reading unit 69 of the common management apparatus 60 can add the terminal ID of the destination candidate to be added included in the destination list management table update request as the terminal ID of a destination candidate associated with the terminal ID of the terminal 10 that has requested the update in the destination list management table. The storing and reading unit 69 of the common management apparatus 60 can delete the terminal ID of the destination candidate to be deleted included in the destination list management table update request from among the terminal IDs of destination candidates associated with the terminal ID of the terminal 10 that has requested the update in the destination list management table.

Thereafter, the transmission and reception unit 61 of the common management apparatus 60 transmits the update contents with which the destination list management table has been updated to the respective control apparatuses (50*x*, 50*y*, and 50*z*) included in the communications system 1. When the transmission and reception unit 51 of the respective control apparatuses (50*x*, 50*y*, and 50*z*) have received the update contents, the storing and reading units 59 of the respective control apparatuses 50 update the destination list management tables of the control apparatuses 50 themselves, respectively, based on the update contents. Thus, the destination list management tables of the respective control apparatuses (50*x*, 50*y*, and 50*z*) are synchronized with the destination list management table of the common management apparatus 60 (steps S26-2-1, S26-2-2, . . . ).

(3) Operation State Management Sequence

Figure 9:
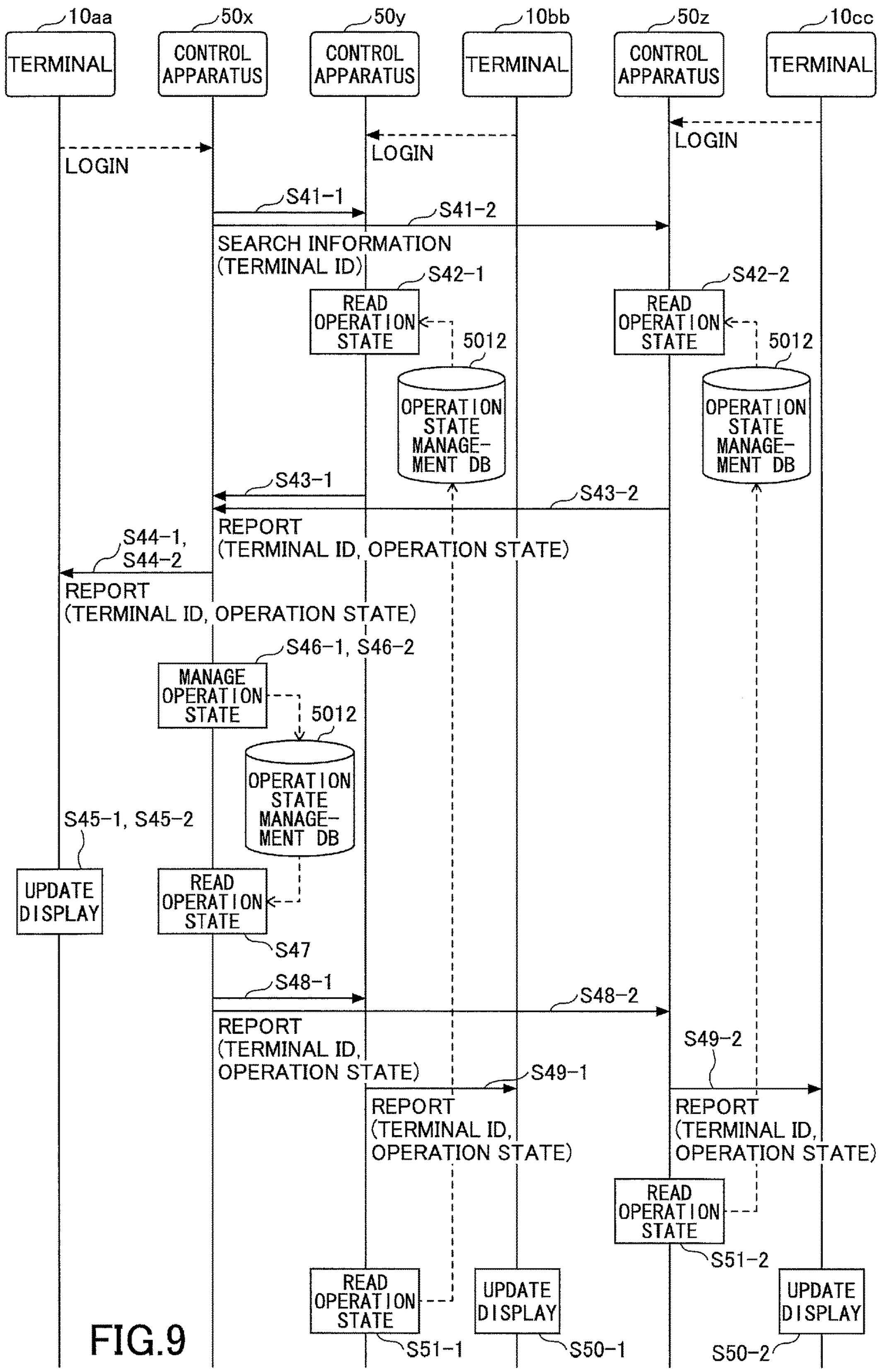
FIG. 9 is a sequence diagram illustrating one example of a process to synchronize operation states among control apparatuses according to the first embodiment.

As one example of an inter-node linkage process, a process to synchronize the operation states of terminals 10 managed in the respective control apparatuses (50*x*, 50*y*, and 50*z*) among the control apparatuses (50*x*, 50*y*, and 50*z*) will be described. FIG. 9 is a sequence diagram illustrating one example of a process to synchronize the operation states among the control apparatuses 50.

When a terminal 10 (assumed as the terminal 10*aa*) has logged in to a control apparatus 50 (assumed as the control apparatus 50*x*), the search unit 54 of the control apparatus 50*x* carries out node search for terminals 10 of destination candidates (assumed as terminals (10*bb* and 10*cc*)) (step S41-1, S41-2). "Node search" means a process to know control apparatuses 50 that are connected to the terminals 10 of destination candidates that are not connected to the control apparatus 50*x*. Therefore, node search is carried out on the terminals 10 that are not connected to the control apparatus 50*x*, from among the terminals 10 of destination candidates.

In order to carry out node search, the transmission and reception unit 51 of the control apparatus 50*x* transmits search information for node search to the other control apparatuses (50*y* and 50*z*) based on the request of the search unit 54. The search information includes the terminal ID of the terminal 10*aa* connected to the control apparatus 50*x*, and the terminal IDs of the terminals (10*bb* and 10*cc*) of destination candidates not connected to the control apparatus 50*x* itself. When the transmission and reception units 51 of the control apparatuses (50*y* and 50*z*) have received the search information, each of their storing and reading units 59 reads the operation state of the terminal ID of the terminal (10*bb* or 10*cc*) connected to the control apparatus 50 itself from among the terminals 10 of destination candidates included in the search information, from the own operation state management table (steps S42-1 and S42-2).

Then, the transmission and reception unit 51 of each of the control apparatuses (50*y* and 50*z*) transmits a report that includes the terminal ID of the terminal (10*bb* or 10*cc*) connected to the control apparatus 50 itself, and its operation state that is read in step 42-1 or S42-2 to the control apparatus 50*x*, as a response to the search information (steps S43-1 and S43-2). When the transmission and reception unit 51 of the control apparatus 50*x* has received the respective reports, the transmission and reception unit 51 transmits the respective reports to the terminal 10*aa* that has logged in (steps S44-1 and S44-2). When the transmission and reception unit 11 of the terminal 10*aa* has received the reports, the display control unit 17 updates the icons that indicate the operation states of the terminals (10*bb* and 10*cc*) of destination candidates in the destination list based on the terminal IDs and the operation states of the terminals (10*bb* and 10*cc*) of destination candidates included in the reports (steps S45-1 and S45-2).

On the other hand, in the control apparatus 50*x*, based on a request from the management unit 53, the storing and reading unit 59 stores the operation states and the terminal IDs in the operation state management table where the operation states included in the respective reports transmitted from the control apparatuses (50*y* and 50*z*) are associated with the terminal IDs (of the terminals 10*bb* and 10*cc*) included in the respective reports (steps S46-1 and S46-2). Thus, the control apparatus 50*x* can know the operation states of the terminals (10*bb* and 10*cc*) of destination candidates for the terminal 10*aa* connected to the control apparatus 50*x* itself.

Also, the storing and reading unit 59 of the control apparatus 50*x* reads the operation state corresponding to the terminal ID of the terminal 10*aa* connected to the control apparatus 50*x* itself from the operation state management table (step S47). The transmission and reception unit 51 of the control apparatus 50*x* transmits a report including the terminal ID of the terminal 10*aa* and its operation state that is read in step S47 to the control apparatuses (50*y* and 50*z*) to which the terminals (10*bb* and 10*cc*) of destination candidates are connected (steps S48-1 and S48-2). When the transmission and reception units 51 of the control apparatuses (50*y* and 50*z*) have received the reports respectively, the transmission and reception units 51 transmit the received reports to the respective terminals (10*bb* and 10*cc*) to which the control apparatuses 50*y* and 50*z* themselves are connected (steps S49-1 and S49-2). When the transmission and reception unit 11 of each of the terminals (10*bb* and 10*cc*) has received the report, the display control unit 17 updates the icon that indicates the operation state of the terminal 10*aa* in the destination list (steps S50-1 and S50-2) based on the terminal ID and the operation state of the terminal 10*aa* included in the report.

Also, in each of the control apparatuses (50*y* and 50*z*), based on a request from the management unit 53, the storing and reading units 59 updates the operation state of the terminal 10*aa* in the operation state management table (steps S51-1 and S51-2) based on the report transmitted from the control apparatus 50*x*. Thus, each of the control apparatuses (50*y* and 50*z*) can know the operation state of the terminal 10*aa* connected to the control apparatus 50*x*.

Note that, each time the operation state of a terminal 10 connected to a control apparatus 50 is updated, the control apparatus 50 and the terminal 10 repeat steps S42-1 through S46-1, steps S42-2 through S46-2, and steps S47 through S51-1 and S51-2, respectively. Thus, the respective control apparatuses 50, and the respective terminals 10 or the users of the respective terminals 10 can know the latest operation states of the respective terminals 10.

(4). Session Establishing Sequence

Figure 10:
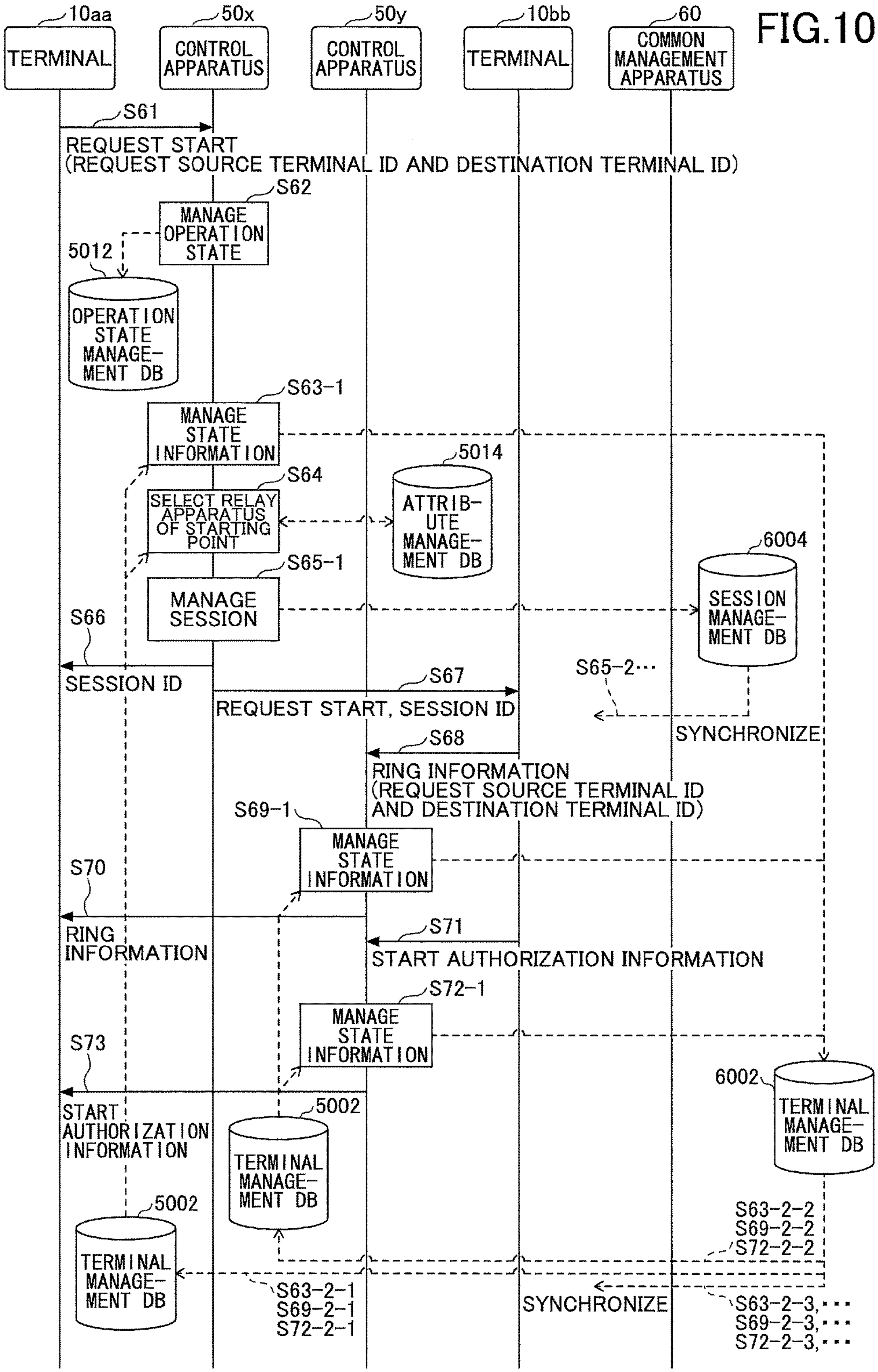
FIG. 10 is a sequence diagram illustrating one example of a process to transmit information between terminals according to the first embodiment.

A process of transmitting information among terminals 10 to establish a session sed will now be described. FIG. 10 is a sequence diagram illustrating one example of a process of transmitting information between terminals 10 according to the first embodiment. Below, a case where the terminal 10*aa* connected to the control apparatus 50*x* transmits a communications start request to the terminal 10*bb* connected to the control apparatus 50*y* as a destination will be described.

The terminal 10*aa* responds to the user's operation on the input unit 110, to transmit a communications start request to the control apparatus 50*x* through the transmission and reception unit 11 (step S61). The communications start request includes the terminal ID "01aa" of the terminal 10*aa* of the communications start request source, and the terminal ID "01bb" of the terminal 10*bb* of the destination.

When the transmission and reception unit 51 of the control apparatus 50*x* has received the communications start request, the storing and reading unit 59 of the control apparatus 50*x* stores the operation state "online (under communications)" and the terminal ID of the terminal 10*aa* of the communications start request source, based on a request of the management unit 53, in the operation state management table where the operation state "online (under communications)" is associated with the terminal ID of the terminal 10*aa* of the communications start request source (step S62). The updated operation state "online (under communications)" is reported to the terminals 10 that are the destination candidates of the terminal 10*aa* through steps S47 through S50-1 and S50-2.

Also, the management unit 53 manages the communications states of the terminals 10 according to the state transition rule indicated by the state transition diagram (step S63-1). That is, in step S61, the management unit 53 of the control apparatus 50*x* determines state information that indicates a new state of the terminal 10*aa* of the communications start request source as "inviting" based on the received communications start request, and determines state information that indicates a new state of the terminal 10*bb* of the destination as "invited". Then, the management unit 53 transmits a terminal management table update request where the state information "inviting" and "invited" that indicate the new states of the terminals (10*aa* and 10*bb*) are associated with the respective terminal IDs of the terminals (10*aa* and 10*bb*) of the start request source and the destination to the common management apparatus 60.

When the transmission and reception unit 61 of the common management apparatus 60 has received the terminal management table update request, the storing and reading unit 69 of the common management apparatus 60 stores the terminal IDs and the state information in the own terminal management table where the respective terminal IDs included in terminal management table update request are associated with the corresponding items of state information. Then, as a result of steps similar to steps S8-2-1, S8-2-2, . . . being carried out, the terminal management tables of the respective control apparatuses (50*x*, 50*y*, and 50*z*) are synchronized with the terminal management table of the common management apparatus 60 (step S63-2-1, S63-2-2, 63-2-3, . . . ).

Then, the session control unit 58 selects, from among the relay apparatuses (30*xx* and 30*yy*) connected to the terminals (10*aa* and 10*bb*), a relay apparatus 30 as a starting point in the session sed (step S64).

The session control unit 58 reads the attribute management DB 5014, to determine the relay apparatus 30.

According to the attribute management table, if the network identifiers corresponding to the terminals 10*aa* and 10*bb* are the network identifiers of intranets 100, the session control unit 58 selects a relay apparatus 30 included in the intranet 100.

If the terminals 10*aa* and 10*bb* can use the same relay apparatus 30 from among the relay apparatuses 30 included in the intranets 100, the session control unit 58 selects the same relay apparatus 30.

If it is not possible for the terminals 10*aa* and 10*bb* to use the same relay apparatus 30, the session control unit 58 selects different relay apparatuses 30 included in the intranets 100 for the terminals 10*aa* and 10*bb*, respectively.

For example, if the terminal 10*aa* has the network identifier of the intranet 100A, and the terminal 10*bb* has the network identifier of the intranet 100B, the session control unit 58 selects a relay apparatus 30 for the terminal 10*aa* from among the relay apparatuses 30 included in the intranet 100A. In the same way, the session control unit 58 selects a relay apparatus 30 for the terminal 10*bb* from among the relay apparatuses 30 included in the intranet 100B. In such a case where two relay apparatuses 30 are thus selected for the terminals 10*aa* and 10*bb*, respectively, the session control unit 58 may select the relay apparatus 30 selected for the terminal 10*aa* of the communications start request source as the starting point, for example.

Content data transmitted and received between the terminals 10*aa* and 10*bb* is transmitted and received via the selected relay apparatus 30 in the intranet 100A and the selected relay apparatus 30 in the intranet 100B. Therefore, even if the terminals 10*aa* and 10*bb* are located at different bases, it is possible to transmit and receive content data using a safe and suitable route.

If a relay apparatus 30 selected by the session control unit 58 is different from the relay apparatus 30 selected at the time of login, the session control unit 58 carries out an appropriate process for when a relay apparatus 30 is again selected. For example, the session control unit 58 updates the relay apparatus ID managed in the terminal management DB 6002. Note that, the case where a relay apparatus 30 is again selected may be, for example, a case where a relay apparatus 30 already selected for the terminal 10*aa* is included in a network different from a network of the terminal 10*bb* with which the terminal 10*aa* will carry out communications. In such a case, the session control unit 58 may select another relay apparatus 30 included in the network in which the terminal 10*bb* is included.

If the terminals 10*aa* and 10*bb* are included in intranets 100, the session control unit 58 selects relay apparatuses 30 included in the intranets 100. As a result, content data transmitted and received between the terminals 10*aa* and 10*bb* are not transmitted outside the intranets 100. Thus, it is possible to reduce the information leakage risk. Also, it is possible to reduce the transmission delay of content data.

Note that, the relay apparatus selection unit 56 may select the relay apparatuses 30.

The relay apparatus 30, selected in step S64 as the starting point, manages the entirety of relaying content data between the nodes (including the terminals 10 and the relay apparatuses 30). If a plurality of relay apparatuses 30 are used, the selected relay apparatus 30 is used as the starting point, and information that indicates a destination to which content data will be relayed is given to each of the other relay apparatuses 30. Below, the description will be continued assuming that the session control unit 58 consequently selects the relay apparatus 30*xx*.

Then, the management unit 53 manages information concerning the session sed to be established between the terminals (10*aa* and 10*bb*) (step S65-1). First, the management unit 53 generates a session ID to identify the session sed to be established between the terminals (10*aa* and 10*bb*). In this case, the management unit 53 generates a session ID (for example, "conf01.001xx") that includes information that indicates the relay apparatus 30*xx* selected as the starting point in step S64 (for example, "001xx"). Then, the transmission and reception unit 51 transmits a session management table update request that includes the generated session ID, and the terminal IDs of the terminals (10*aa* and 10*bb*) of the communications start request source and the destination to the common management apparatus 60, based on a request of the management unit 53.

When the transmission and reception unit 61 of the common management apparatus 60 has received the session management table update request, the storing and reading unit 69 of the common management apparatus 60 stores the session ID and the terminal IDs included in the session management update request in the own session management table where the session ID is associated with the terminal IDs. Thereafter, the transmission and reception unit 61 transmits the update contents with which the session management table has been updated to the respective control apparatuses (50*x*, 50*y*, and 50*z*) included in the communications system 1. When the transmission and reception units 51 of the respective control apparatuses (50*x*, 50*y*, and 50*z*) have received the update contents, the storing and reading units 59 of the respective control apparatuses 50 update the session management tables of the control apparatuses 50 themselves based on the update contents. Thus, the terminal management tables of the respective control apparatuses (50*x*, 50*y*, and 50*z*) are synchronized with the session management table of the common management apparatus 60 (steps S65-2-1, . . . ).

Also, the transmission and reception unit 51 of the control apparatus 50*x* transmits the session ID generated in step S65-1 to the terminal 10*aa* of the communications start request source (step S66). Also, the transmission and reception unit 51 of the control apparatus 50*x* transmits the communications start request transmitted from the terminal 10*aa* of the start request source, and the above-mentioned session ID, to the terminal 10*bb* of the destination (step S67). Note that the terminal management table of the control apparatus 50*x* is synchronized with the terminal management table of the common management apparatus 60 based on the IP address of the terminal 10*bb* transmitted from the common management apparatus 60, and manages the IP address of the terminal 10*bb* of the destination. Therefore, the transmission and reception unit 51 of the control apparatus 50*x* can directly transmit the communications start request, and so forth, to the terminal 10*bb*, without querying the control apparatus 50*y*, to which the terminal 10*bb* of the destination is connected, about the IP address or using the control apparatus 50*y*.

When the transmission and reception unit 11 of the terminal 10*bb* of the destination has received the communications start request, the communications control unit 13 of the terminal 10*bb* outputs a ring tone from the speaker. Then, the transmission and reception unit 11 of the terminal 10*bb* transmits ring information that indicates that a ring tone is being output, to the control apparatus 50*y* to which the terminal 10*bb* itself is connected (step S68). The ring information includes the terminal IDs of the terminals (10*aa* and 10*bb*) of the communications start request source and the destination.

When the transmission and reception unit 51 of the control apparatus 50*y* has received the ring information, the management unit 53 of the control apparatus 50*y* manages the communications states of the terminals 10 according to the state transition rule indicated in the state transition diagram (step S69-1). That is, the management unit 53 determines state information that indicates a new state of the terminal 10*aa* of the start request source as "calling", and determines state information that indicates a new state of the terminal 10*bb* of the destination as "ringing" based on the ring information that the control apparatus 50*y* has received in step S68. Then, the transmission and reception unit 51 transmits a terminal management table update request where the respective items of state information "calling" and "ringing" that indicate the new states of the terminals (10*aa* and 10*bb*) are associated with the respective terminal IDs of the terminals (10*aa* and 10*bb*) of the communications start request source and the destination, to the common management apparatus 60.

When the transmission and reception unit 61 of the common management apparatus 60 have received the terminal management table update request, the storing and reading unit 69 of the common management apparatus 60 stores the terminal IDs and the corresponding items of state information in the own terminal management table where the terminal IDs are associated with the respective items of state information included in the terminal management table update request. Thereafter, as a result of steps similar to steps S8-2-1, S8-2-2, . . . being carried out, the terminal management tables of the respective control apparatuses (50*x*, 50*y*, and 50*z*) are synchronized with the terminal management table of the common management apparatus 60 (steps S69-2-1, S69-2-2, and S69-2-3).

Then, the transmission and reception unit 51 of the control apparatus 50*y* transmits the ring information transmitted from the terminal 10*bb* of the destination to the terminal 10*aa* of the communications start request source (step S70). Note that, because the terminal management table of the control apparatus 50*y* is synchronized with the terminal management table of the common management apparatus 60 based on the information transmitted from the common management apparatus 60, the terminal management table of the control apparatus 50*y* manages the IP address of the terminal 10*aa* of the communications start request source. Therefore, the transmission and reception unit 51 of the control apparatus 50*y* can transmit the ring information directly to the terminal 10*aa*, without querying the control apparatus 50*x*, to which the terminal 10*aa* is connected, about the destination information or using the control apparatus 50*x*.

On the other hand, in the terminal 10*bb* of the destination, when the reception unit 12 has received authorization to start communications based on the user's input operation, the transmission and reception unit 11 of the terminal 10*bb* transmits start authorization information that indicates to authorize to start communications to the control apparatus 50*y* to which the terminal 10*bb* itself is connected (step S71). The start authorization information includes the terminal IDs of the terminals (10*aa* and 10*bb*) of the communications start request source and the destination.

When the transmission and reception unit 51 of the control apparatus 50*y* has received the start authorization information, the management unit 53 of the control apparatus 50_y_ determines state information that indicates each of new states of the terminals (10_aa_ and 10_bb_) of the communications start request source and the destination as "accepted" based on the received start authorization information through a step similar to step S69-1. Then, the transmission and reception unit 51 transmits a terminal management table update request that includes the respective terminal IDs of the terminals (10_aa_ and 10_bb_) of the communications start request source and the destination, and the state information "accepted" that indicates each of the new states of the terminals (10_aa_ and 10_bb_), to the common management apparatus 60 (step S72-1).

When the transmission and reception unit 61 of the common management apparatus 60 has received the terminal management table update request, the storing and reading unit 69 of the common management apparatus 60 stores the respective terminal IDs and the respective items of state information included in the terminal management table update request in the own terminal management table where the respective terminal IDs are associated with the respective items of state information. Then, as a result of steps similar to steps S8-2-1, S8-2-2, . . . being carried out, the terminal management tables of the respective control apparatuses (50_x_, 50_y_, and 50_z_) are synchronized with the terminal management table of the common management apparatus 60 (steps S72-2-1, S72-2-2, S72-2-3, . . . ).

Then, the transmission and reception unit 51 of the control apparatus 50_y_ transmits the start authorization information to the terminal 10_aa_ of the start request source transmitted from the terminal 10_bb_ of the destination in a step similar to step S70 (step S73).

(5) Relay Apparatus Selection Flowchart

Figure 11:
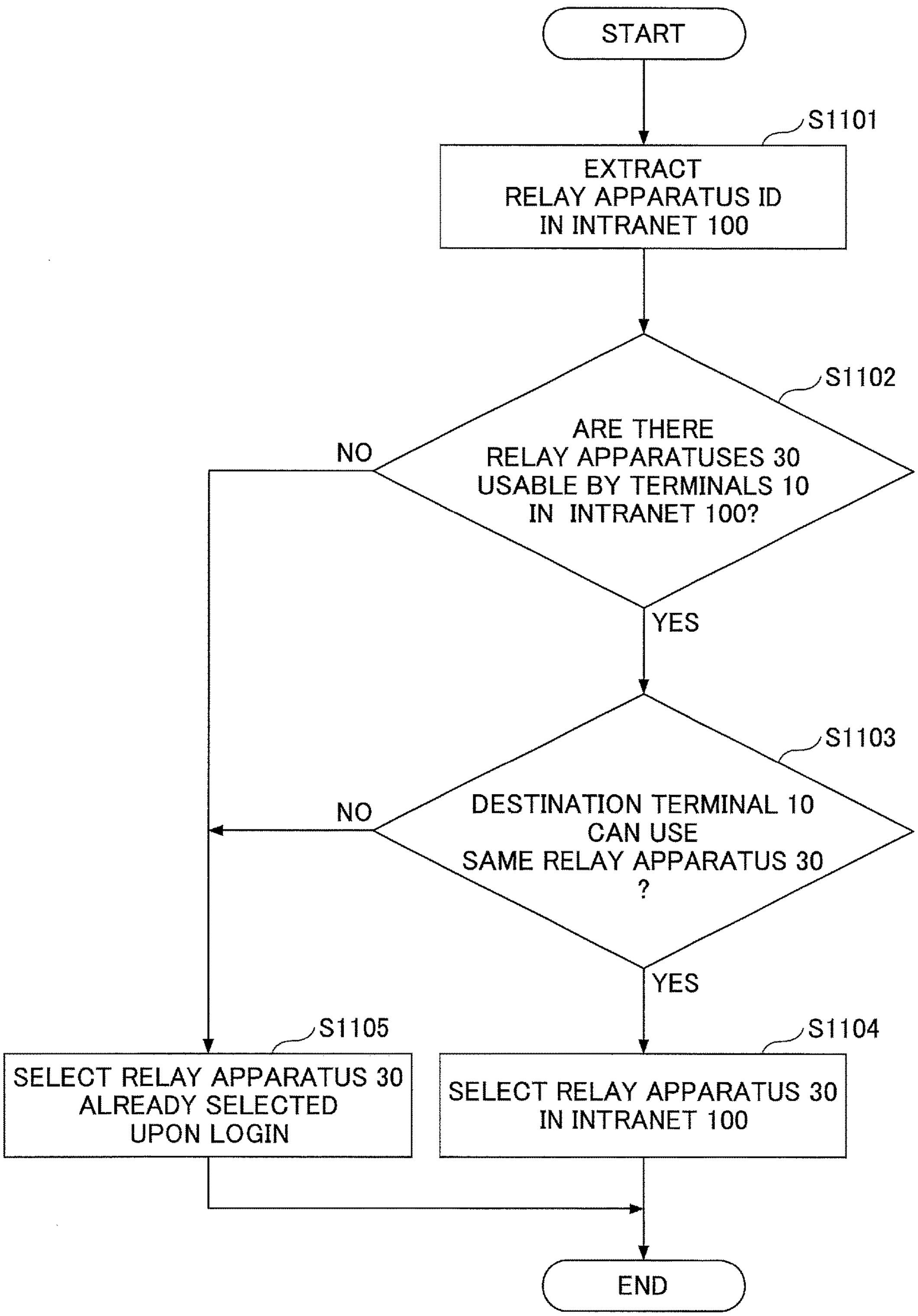
FIG. 11 is a flowchart illustrating one example of a process for selecting a relay apparatus.

FIG. 11 is a flowchart illustrating one example of a process for selecting a relay apparatus 30 according to the first embodiment.

The relay apparatus selection unit 56 of a control apparatus 50 selects a relay apparatus 30 for relaying conversation between a communications request source terminal (for example, the terminal 10_aa_) and a destination terminal (for example, the terminal 10_dd_) based on the relay apparatus management DB 5011 and the attribute management DB 5014. A process for selecting a relay apparatus 30 will now be described in detail with reference to FIG. 11.

An environment where a relay apparatus 30 is installed may be an intranet 100 or the Internet. In the flowchart illustrated in FIG. 11, the control apparatus 50 selects a relay apparatus 30 included in an intranet 100 in a case where content data is transmitted and received between terminals 10 included in the intranet 100.

The relay apparatus selection unit 56 determines whether there are relay apparatuses 30 included in the intranet 100 that the terminals 10 can use, by reading the attribute management table (see FIGS. 6H, 6I, and 6J).

In order that terminals 10 transmit and receive content data using a relay apparatus 30 included in an intranet 100, at least the transmission and reception unit 51 of a control apparatus 50 is to transmit information such as the URI of the relay apparatus to the terminals 10. Therefore, the relay apparatus selection unit 56 reads the relay apparatus management table (FIG. 6E), to identify the URI or the like of the relay apparatus 30.

As can be seen from FIG. 5, the data of the attribute management table (see FIGS. 6H, 6I, and 6J) is stored in the attribute management DB 5014 managed by each control apparatus 50, and the attribute management DB 6014 managed by the common management apparatus 60. Also, the data of the relay apparatus management table (FIG. 6E) is stored in the relay apparatus management DB 5011 managed by each control apparatus 50, and the relay apparatus management DB 6011 managed by the common management apparatus 60. Concerning the data of the DBs, in the same way as steps S24 through S26-2 of FIG. 8, for example, the DBs managed by the respective control apparatuses 50 are synchronized with the DBs managed by the common management apparatus 60. Therefore, all the control apparatuses 50 included in the management system 5 can read the attribute management table (see FIGS. 6H, 6I, and 6J), and the relay apparatus management table (see FIG. 6E).

In step S1101, the relay apparatus selection unit 56 searches the attribute management table (see FIG. 6H, FIG. 6I, and FIG. 6J) of the attribute management DB 5014 based on the terminal IDs of the communications request source terminal (the terminal 10_aa_) and the destination terminal (the terminal 10_dd_). The relay apparatus selection unit 56 extracts the relay apparatus IDs of available relay apparatuses 30 included in the intranet 100.

In step S1102, the relay apparatus selection unit 56 determines whether the relay apparatuses 30 that the communications request source terminal (the terminal 10_aa_) and the destination terminal (the terminal 10_dd_) can use are included in the intranet 100. Note that not all the terminals 10 can use the relay apparatuses 30 included in the intranet 100.

If there are no relay apparatuses 30 usable by the terminals 10_aa_ and 10_dd_ and included in the intranet 100 (NO in step S1102), the process proceeds to step S1105.

In step S1105, the terminals 10_aa_ and 10_dd_ transmit and receive content data using a relay apparatus 30 selected at the time of login.

If there are relay apparatuses 30 usable by the terminals 10_aa_ and 10_dd_ and included in the intranet 100 (YES in step S1102), the process proceeds to step S1103.

In step S1103, the relay apparatus selection unit 56 determines whether the relay apparatuses 30 usable by the terminals 10_aa_ and 10_dd_ determined in step S1102 are the same as one another.

If it is possible to select the common relay apparatus 30 (YES in step S1103), the process proceeds to step S1104. If it is not possible to select the common relay apparatus 30 (NO in step S1103), the process proceeds to step S1105.

Below, as an example, a case where the attribute management table of FIG. 6H, for example, is used will now be described. The relay apparatus selection unit 56 extracts the relay apparatuses 30 that have the relay apparatus IDs 001aa and 001cc as relay apparatuses 30 that the terminal 10_aa_ (the terminal ID: 01aa@xx.com) can use. Also, the relay apparatus selection unit 56 extracts the relay apparatuses 30 that have the relay apparatus IDs 001aa and 001dd as relay apparatuses 30 that the terminal 10_dd_ (the terminal ID: 01dd@xx.com) can use.

The relay apparatus selection unit 56 determines that the terminal 10_aa_ can use the relay apparatus 30 that has the relay apparatus ID 001aa. In addition, the relay apparatus selection unit 56 determines that the terminal 10_dd_ can use the relay apparatus 30 that has the same relay apparatus ID 001aa. Then, the relay apparatus selection unit 56 proceeds to step S1104.

Below, as another example, a case where the attribute management tables of FIGS. 6I and 6J are used will be described. The relay apparatus selection unit 56 reads the attribute management table of FIG. 6J, and determines that the identifier of the network in which the terminal 10_aa_ (the terminal ID: 01aa@xx.com) is included is "intranet 100A". Also, the relay apparatus selection unit 56 reads the attribute management table of FIG. 6I, and determines that the relay apparatus ID of the relay apparatus 30 included in the same intranet 100A is 001aa. Further, the relay apparatus selection unit 56 reads the attribute management table of FIG. 6J, and determines that the identifier of the network in which the terminal 10*dd* (the terminal ID01dd@xx.com) is included is "intranet 100A". Also, the relay apparatus selection unit 56 reads the attribute management table of FIG. 6I, and determines that the relay apparatus ID of the relay apparatus 30 included in the same intranet 100A is 001aa.

The relay apparatus selection unit 56 determines that the terminal 10*aa* can use the relay apparatus 30 that has the relay apparatus ID 001aa, also, the terminal 10*dd* can use the relay apparatus 30 that has the relay apparatus ID 001aa, and proceeds to step S1104.

In step S1104, the relay apparatus 30 having the relay apparatus ID 001aa and usable by the terminal 10*aa* and the terminal 10*dd* is selected.

By using the above-described method for selecting a relay apparatus 30, if the terminal 10*aa* and the terminal 10*dd* are include in an intranet 100, the terminal 10*aa* and the terminal 10*dd* are connected to a relay apparatus that is included in the intranet 100. Therefore, content data transmitted and received between all the terminals 10 participating in a session and the relay apparatus 30 is transmitted and received within the intranet 100. As a result, the communications route is optimized, and the communications rate is improved. Also, because transmitted and received content data does not pass through any firewall 110, it is possible to reduce the information leakage risk.

If, although the terminal 10*aa* and the terminal 10*dd* are included in the intranet 100, it is not possible to select a common relay apparatus 30 (NO in step S1103), the process proceeds to step S1105. In this case, the control apparatus 50 may cause the terminals 10*aa* and 10*dd* to use the relay apparatuses 30 in the intranet 100 extracted by the relay apparatus selection unit 56. Also in this case, because content data transmitted and received between the terminals 10*aa* and 10*dd* does not pass through any firewall 110, it is possible to reduce the information leakage risk.

Because a terminal 10 is portable, the terminal 10 may be included in none of the networks recorded in the attribute management table. For example, although a terminal 10 is registered as being included in the intranet 100A established inside a company A, the terminal 10 can be carried outside the company, and can be connected to the Internet to log in to the communications system 1. Thus, there is no guarantee that a terminal 10 is included in an intranet 100, and therefore, it may be impossible to determine, using the attribute information of the attribute management table, that a relay apparatus within the intranet 100 can be used.

If the relay apparatus selection unit 56 selects a relay apparatus 30 included in an intranet 100 even though a terminal 10 is included in the Internet but is not included in an intranet 100, it is not possible to transmit and receive content data. This is because there is no network connection between the terminal 10 included in the Internet and the relay apparatus 30 included in the intranet 100.

In order to solve the problem, a step to urge the user to determine whether to use a relay apparatus 30 included in the intranet 100 may be inserted before step S1102.

If it is determined according to the information of the attribute management table that a relay apparatus 30 included in the intranet 100 can be used, the transmission and reception unit 51 of the control apparatus 50 may transmit a report to the terminal 10 to determine "whether to use the relay apparatus 30 included in the internet 100".

The display control unit 17 of the terminal 10 that has received this report may display a message that "do you use relay apparatus 30 included in intranet 100?", and the reception unit 12 of the terminal 10 may receive the user's selection that is input in response to the message.

Note that, even if the relay apparatus selection unit 56 can extract a common relay apparatus 30 for the terminals 10*aa* and 10*dd*, step S1105 may be carried out depending on the state of the relay apparatus 30. For this purpose, the control apparatus 50 searches the relay apparatus management table (see FIG. 6E) of the storage unit 5000 based on the relay apparatus ID of the relay apparatus 30 using the storing and reading unit 59, to acquire the operation state of the corresponding relay apparatus 30. If the acquired operation state is "offline", the control apparatus 50 carries out step S1105.

In an organization of a company in such a large scale as to have bases on a plurality of countries, an intranet 100 may cover different countries. In such a scale of an intranet 100, a plurality of relay apparatuses 30 may be installed in the respective countries.

In consideration of such a situation, a further advantageous method to select a relay apparatus 30 included in an intranet 100 will now be described. If a plurality of relay apparatuses 30 are included in the same intranet 100, the attribute management table (FIG. 6H) registers a plurality of relay apparatus IDs included in the intranet 100 usable by terminals 10.

Also, as described above, terminals 10 are portable. Therefore, for example, a user can bring a terminal 10 and connect the terminal 10 to an intranet 100 of the United States after using the terminal 10 connecting to an intranet 100 of Japan. Also, relay apparatuses 30 included in an intranet 100 of the same organization can transmit and receive content data between the relay apparatuses 30.

Therefore, for example, if a terminal 10 has a GPS (Global Positioning System), the terminal 10 may transmit position information acquired from the GPS to a control apparatus 50 at a time of transmitting a login request (step S1 in FIG. 7). When selecting a relay apparatus 30, the control apparatus 50 may select a physically near relay apparatus 30 based on the position information. Thus, it is possible to optimize a network route between a terminal 10 and a relay apparatus 30, and it is possible that content data, such as video data and sound data, is transmitted and received with a reduced delay at high quality. Thus, it is possible to provide a high-quality video conference service.

(6) Content Data Relay Sequence

Figure 12A:
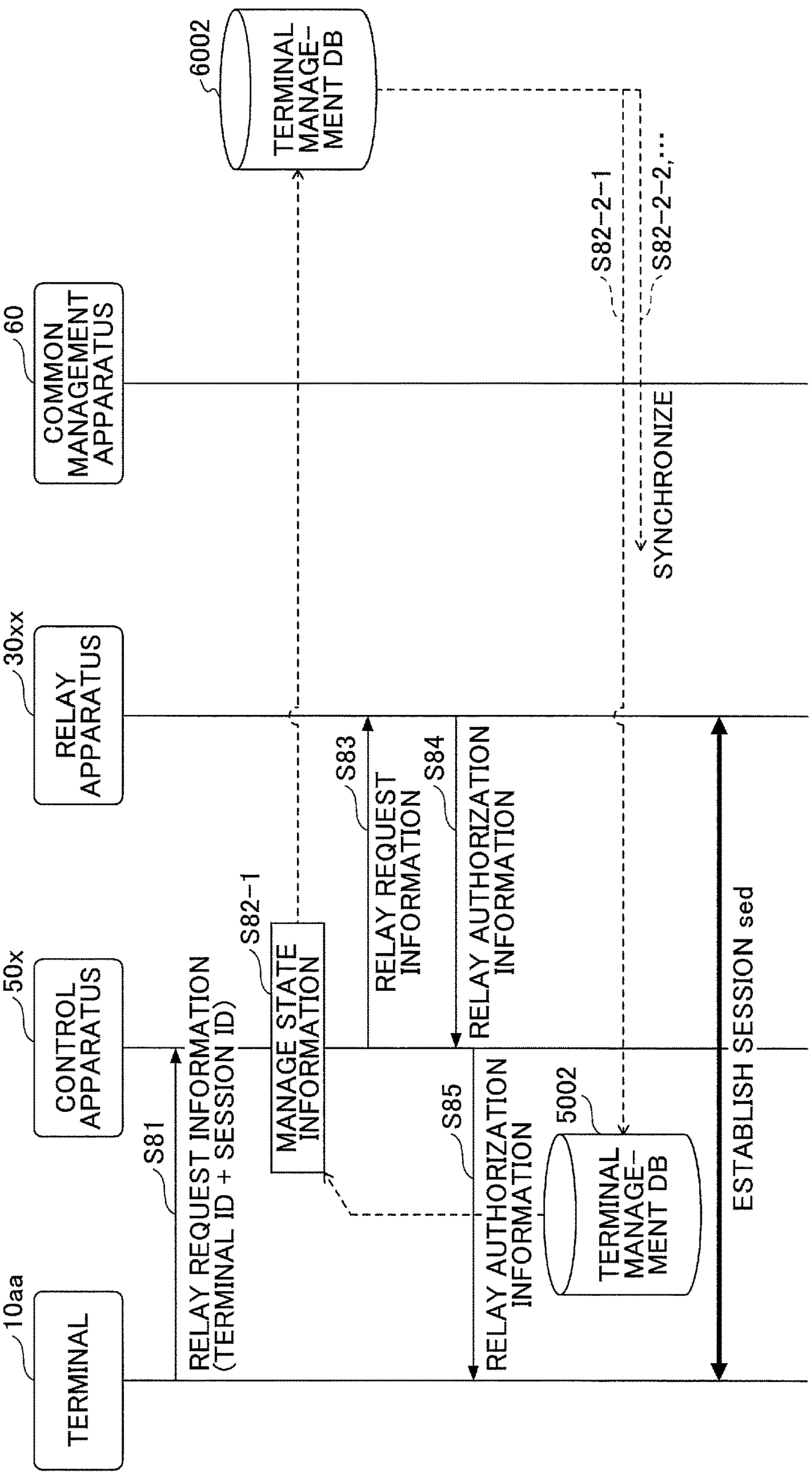
FIGS. 12A and 12B are sequence diagrams illustrating one example of a process to start relaying content data according to the first embodiment.
Figure 12B:
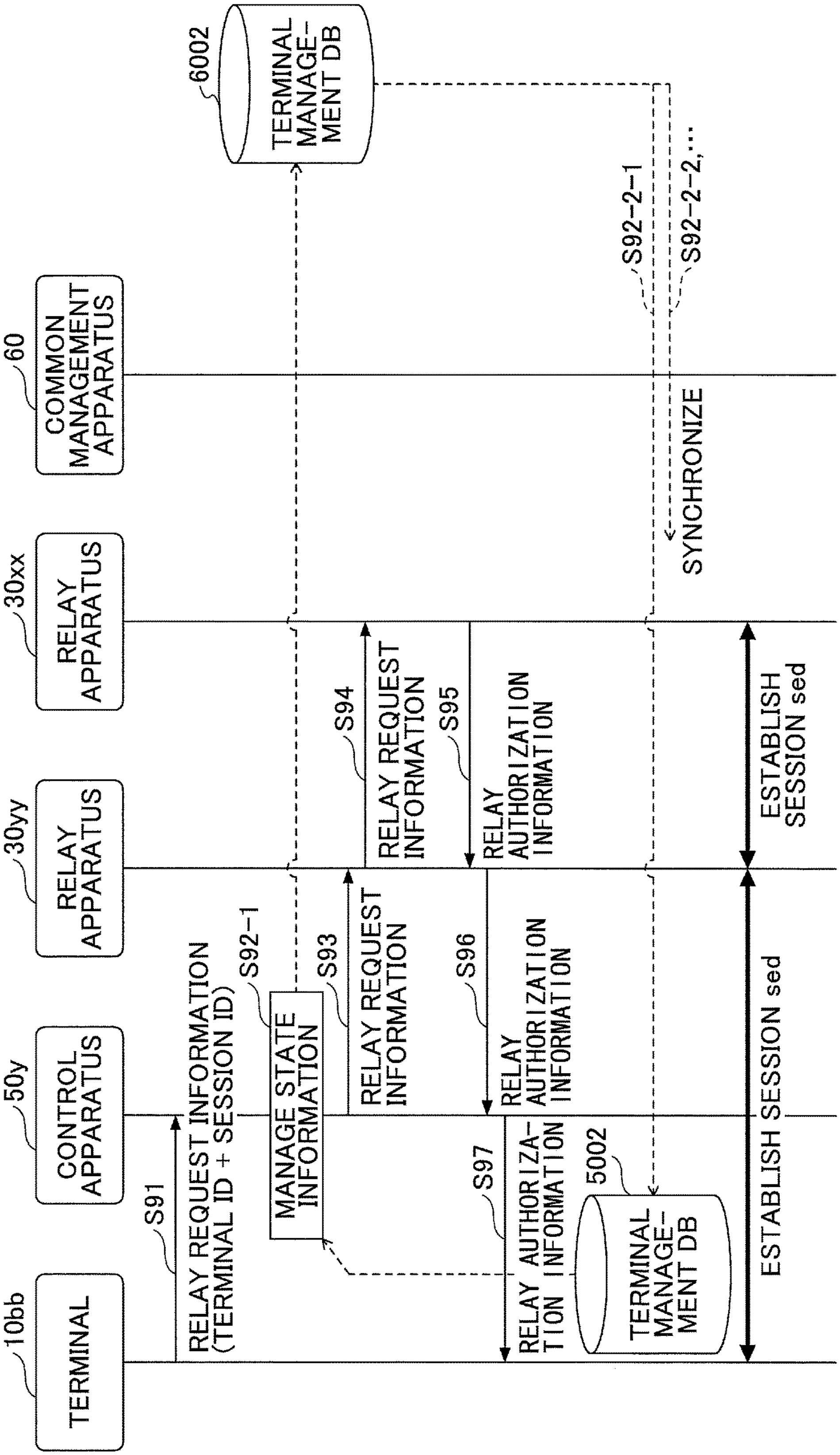

A process for the respective terminals (10*aa* and 10*bb*) of the communications start request source and the destination to request to start relaying to the respective relay apparatuses (30*xx* and 30*yy*) to which the terminals are connected will now be described. FIGS. 12A and 12B are sequence diagrams illustrating an example of a process to start relaying content data according to the first embodiment.

First, with reference to FIG. 12A, a process of establishing a session sed between the terminal 10*aa* and the relay apparatus 30*xx* to start relaying content data between the terminals (10*aa* and 10*bb*) will be described. The transmission and reception unit 11 of the terminal 10*aa* of the communications start request source transmits relay request information that indicates a request to start relaying content data to the control apparatus 50*x* (step S81) after receiving start authorization information (see step S73 of FIG. 10). The relay request information includes the terminal ID of the terminal 10*aa* of the relay request source, and the session ID "conf01.001xx" received in step S66 (see FIG. 10).

When the transmission and reception unit 51 of the control apparatus 50*x* has received the relay request information, the management unit 53 of the control apparatus 50*x* determines state information that indicates a new state of the terminal 10*aa* of the relay request source as "busy" based on the received relay request information through a step similar to step S63-1 of FIG. 10. Then, the transmission and reception unit 51 transmits a terminal management table update request that includes the terminal ID of the terminal 10*aa* of the relay request source and the state information "busy" that indicates the new state of the terminal 10*aa* of the relay request source to the common management apparatus 60 (step S82-1).

When the transmission and reception unit 61 of the common management apparatus 60 has received these items of information, the storing and reading unit 69 of the common management apparatus 60 stores the terminal ID and the state information included in the terminal management table update request in the own terminal management table (see FIG. 6B) where the terminal ID is associated with the state information. Also, as a result of steps similar to steps S8-2-1, S8-2-2, . . . of FIG. 7 being carried out, the terminal management tables of the respective control apparatuses (50*x*, 50*y*, and 50*z*) are synchronized with the terminal management table of the common management apparatus 60 (steps S82-2-1, S82-2-2, . . . ).

Then, the transmission and reception unit 51 of the control apparatus 50*x* transmits the relay request information transmitted from the terminal 10*aa* of the relay request source to the relay apparatus 30*xx* identified by the relay apparatus ID (step S83) based on the relay apparatus ID "001xx" associated with the terminal ID of the terminal 10*aa* of the relay request source in the terminal management table of the control apparatus 50*x* itself (see FIG. 6B). The transmission and reception unit 31 of the relay apparatus 30*xx* responds to the relay request information, to transmit relay authorization information that indicates to authorize relaying to the control apparatus 50*x* (step S84). When the transmission and reception unit 51 of the control apparatus 50*x* has received the relay authorization information transmitted from the relay apparatus 30*xx*, the transmission and reception unit 51 transmits the relay authorization information to the terminal 10*aa* of the relay request source (step S85).

As a result of the transmission and reception unit 31 of the relay apparatus 30*xx* receiving the relay request information, the relay apparatus 30*xx* can know that the terminal 10*aa* of the relay request source participates in a session identified by the session ID included in the relay request information. Thus, the relay apparatus 30*xx* starts relaying content data transmitted from the terminal 10*aa* to another terminal 10 that participates in the same session as the session in which the terminal 10*aa* participates, and starts relaying content data transmitted from the other terminal 10 to the terminal 10*aa*. Thus, the session sed is established between the terminal 10*aa* and the relay apparatus 30*xx*.

With reference to FIG. 12B, a process to establish the session sed also between the terminal 10*bb* and the relay apparatus 30*yy* and also between the relay apparatuses (30*xx* and 30*yy*) to start relaying content data between the terminals (10*aa* and 10*bb*) will be described.

Note that, if the respective terminals (10*aa* and 10*bb*) of the communications start request source and the destination use the common relay apparatus 30, a process to establish a session between relay apparatuses 30 is unnecessary.

After the transmission and reception unit 11 of the terminal 10*bb* transmits the start authorization information (see step S71 of FIG. 10), the transmission and reception unit 11 transmits relay request information that indicates a request to start relaying content data to the control apparatus 50*y* (step S91). The relay request information includes the terminal ID of the terminal 10*bb* of the relay request source, and the session ID "conf01.001xx" received in step S67 (see FIG. 10).

When the transmission and reception unit 51 of the control apparatus 50*y* has received the relay request information, the management unit 53 of the control apparatus 50*y* determines state information that indicates a new state of the terminal 10*bb* of the relay request source as "busy" based on the received relay request information through a step similar to step S69-1. Then, the transmission and reception unit 51 transmits a terminal management table update request that includes the terminal ID of the terminal 10*bb* of the relay request source and the state information "busy" that indicates the new state of the terminal 10*bb* of the relay request source to the common management apparatus 60 (step S92-1).

When the transmission and reception unit 61 of the common management apparatus 60 has received the terminal management table update request, the storing and reading unit 69 of the common management apparatus 60 stores the terminal ID and the state information included in the terminal management table update request in the own terminal management table (see FIG. 6B) where the terminal ID is associated with the state information. Thereafter, as a result of steps similar to steps S8-2-1, S8-2-2, . . . of FIG. 7 being carried out, the terminal management tables of the respective control apparatuses (50*x*, 50*y*, and 50*z*) are synchronized with the terminal management table of the common management apparatus 60 (steps S92-2-1, S92-2-2, . . . ).

Then, the transmission and reception unit 51 of the control apparatus 50*y* transmits the relay request information transmitted from the terminal 10*bb* of the relay request source to the relay apparatus 30*yy* identified by the relay apparatus ID based on the relay apparatus ID "001yy" associated with the terminal ID of the terminal 10*bb* of the relay request source in the terminal management table of the control apparatus 50*y* (see FIG. 6B) (step S93). Because the session ID "conf01.001xx" included in the relay request information includes information "001xx" that indicates the relay apparatus 30*xx* to be used as the starting point, the relay apparatus 30*yy* that has received the relay request information can know that the relay apparatus 30 to be used as the starting point in the session sed is the relay apparatus 30*xx*. Therefore, the transmission and reception unit 31 of the relay apparatus 30*yy* transmits the relay request information transmitted from the control apparatus 50*y* to the relay apparatus 30*xx* that is used as the starting point (step S94).

The transmission and reception unit 31 of the relay apparatus 30*xx* responds to the relay request information, to transmit relay authorization information that indicates to authorize relaying, to the relay apparatus 30*yy* (step S95). The transmission and reception unit 31 of the relay apparatus 30*yy* responds to the relay request information, to transmit relay authorization information that indicates to authorize relaying, to the control apparatus 50*y* (step S96). When the transmission and reception unit 51 of the control apparatus 50*y* has received the relay authorization information transmitted from the relay apparatus 30*yy*, the transmission and reception unit 51 transmits the relay authorization information to the terminal 10*bb* of the relay request source (step S97).

As a result of the transmission and reception unit 31 of the relay apparatus 30*xx* receiving the relay request information, the relay apparatus 30*xx* can know that the terminal 10*bb* connected to the relay apparatus 30*yy* participates in the session identified by the session ID included in the relay request information. The relay apparatus 30*xx* determines a transmission route of content data based on the relay apparatus 30 connected with each terminal 10 that participates in the session, and reports the determined route to the relay apparatus 30*yy*. For example, the relay apparatus 30*xx* transmits a request, to the relay apparatus 30*yy*, to transmit content data transmitted from the terminal 10*bb* to the relay apparatus 30*xx*, and transmit content data transmitted from the relay apparatus 30*xx* to the terminal 10*bb*. Thus, the relay apparatus 30*yy* starts transmitting content data transmitted from the terminal 10*bb* to the relay apparatus 30*xx*, and also, starts transmitting content data of the terminal 10*aa* transmitted from the relay apparatus 30*xx* to the terminal 10*bb*. Thus, the session sed between the terminal 10*bb* and the relay apparatus 30*yy* and between the relay apparatuses (30*xx* and 30*yy*) is established.

When the session sed between the terminal 10*aa* and the relay apparatus 30*xx*, between the terminal 10*bb* and the relay apparatus 30*yy*, and between the relay apparatuses (30*xx* and 30*yy*) have been all established, content data can be transmitted between the terminals (10*aa* and 10*bb*).

(7) Terminal's Session Participating Sequence

Figure 13:
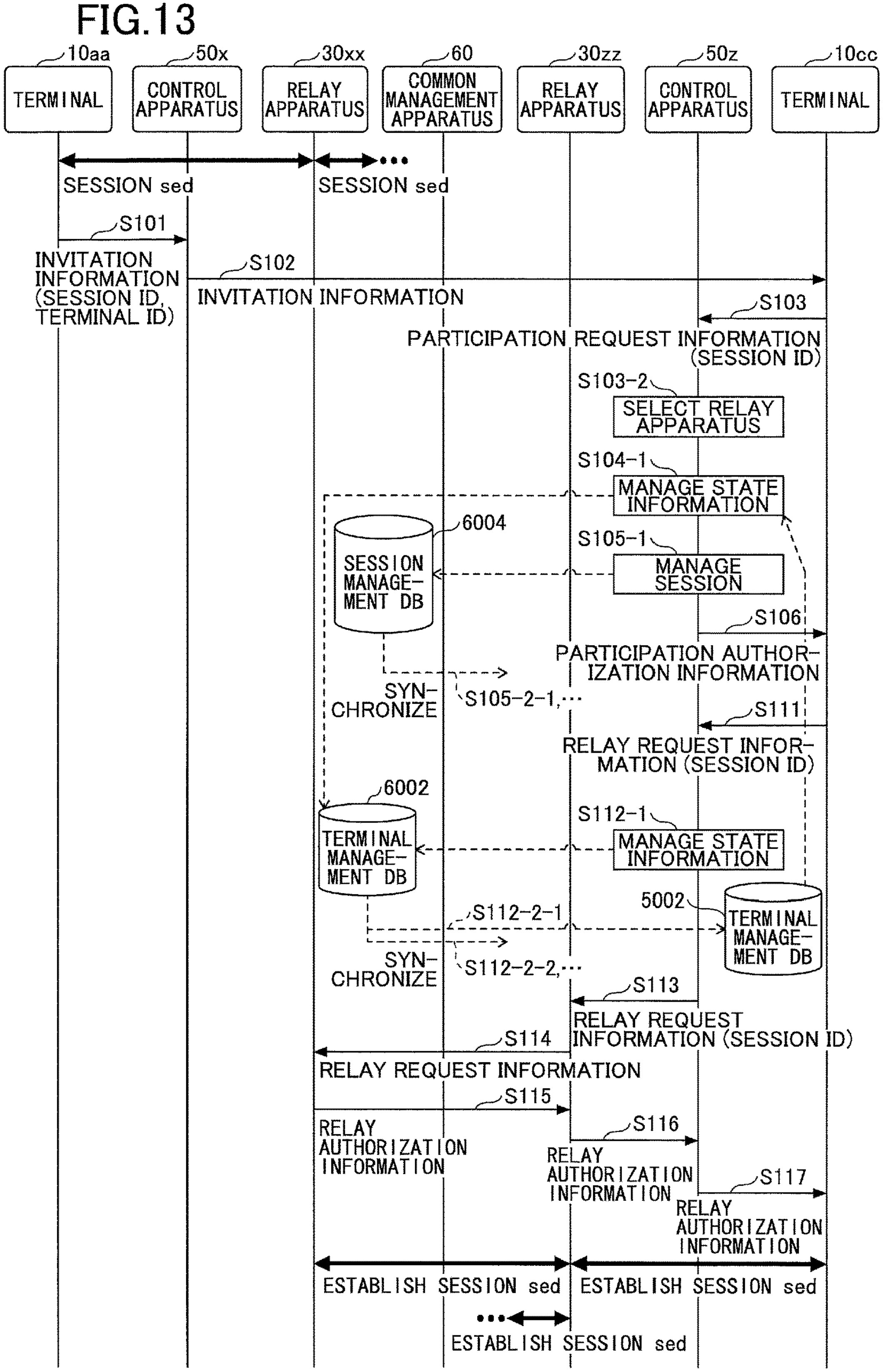
FIG. 13 is a sequence diagram illustrating one example of a process of a terminal to participate in a session according to the first embodiment.

A process for a terminal 10*cc* connected to the relay apparatus 30*zz* to participate in the session sed after the session sed between the terminal 10*aa* and the relay apparatus 30*xx*, between the terminal 10*bb* and the relay apparatus 30*yy*, and between the relay apparatuses (30*xx* and 30*yy*) is established will be described. FIG. 13 is a sequence diagram illustrating one example of a process for a terminal 10 to participate in the session sed according to the first embodiment.

First, when, in the terminal 10*aa* which is participating in the session sed, the reception unit 12 has received a request to invite the terminal 10*cc* to the session sed from the user, the transmission and reception unit 11 of the terminal 10*aa* transmits invitation information that indicates to invite the terminal 10*cc* to the session sed to the control apparatus 50*x* to which to the terminal 10*aa* itself is connected (step S101). The invitation information includes the session ID of the session sed and the terminal ID of the terminal 10*cc* that is invited.

When the transmission and reception unit 51 of the control apparatus 50*x* has received the invitation information transmitted from the terminal 10*aa*, the transmission and reception unit 51 transmits the invitation information to the terminal 10*cc* based on the terminal ID included in the invitation information (step S102). Note that, the terminal management table of the control apparatus 50*x* is synchronized with the terminal management table of the common management apparatus 60 based on information transmitted from the common management apparatus 60, and therefore, manages the IP address of the terminal 10*cc* of the destination. Therefore, the transmission and reception unit 51 of the control apparatus 50*x* can transmit the invitation information directly to the terminal 10*cc* without querying the control apparatus 50*z* to which the terminal 10*cc* of the destination is connected about the destination information, or using the control apparatus 50*z*.

When the transmission and reception unit 11 of the terminal 10*cc* has received the invitation information transmitted from the control apparatus 50*x*, the transmission and reception unit 11 transmits participation request information that indicates a request to participate in the session sed to which the terminal 10*aa* has invited to the control apparatus 50*z* to which the terminal 10*cc* is connected based on the user's request (step S103). The participation request information includes the session ID of the session sed in which the terminal 10*cc* will participate.

When the transmission and reception unit 51 of the control apparatus 50*z* has received the participation request information, the control apparatus 50*z* carries out a relay apparatus selection process (step S103-2). That is, the relay apparatus selection unit 56 of the control apparatus 50*z* selects a relay apparatus 30 included in an intranet 100 if the terminals 10*aa* and 10*bb* are included in the intranet 100, and the relay apparatus 30 is included in the intranet 100, in the session sed which has already been established between the terminal 10*aa* and the terminal 10*bb*.

When the terminal 10*cc* will participate in the session established between the terminals 10*aa* and 10*bb*, it is desirable that also the terminal 10*cc* is included in the intranet 100. When the relay apparatus selection unit 56 of the control apparatus 50*z* will select a relay apparatus 30, the relay apparatus selection unit 56 determines whether the newly participating terminal 10*cc* can use the relay apparatus 30 that is used in the already established session sed.

Actually, the relay apparatus selection unit 56 of the control apparatus 50*z* reads the attribute management table, to extract a relay apparatus 30 included in an intranet 100 usable by the terminal 10*cc*. If the terminal 10*cc* can use the relay apparatus 30*xx* of the terminal 10*aa* or the relay apparatus 30*yy* of the terminal 10*bb*, the relay apparatus selection unit 56 selects the relay apparatus 30*xx* or 30*yy*.

If it is not possible for the terminal 10*cc* to use the relay apparatus 30*xx*, and it is not possible for the terminal 10*cc* to use the relay apparatus 30*yy* either, the relay apparatus selection unit 56 selects another extracted relay apparatus 30 that is included in an intranet 100.

An actual process for selecting the relay apparatus 30 will be described later with reference to FIG. 14. Below, the description will be continued assuming that the relay apparatus 30*zz* included in an intranet 100 is selected for the terminal 10*cc*.

The management unit 53 of the control apparatus 50*z* determines state information that indicates a new state of the terminal 10*cc* of the participation request source as "accepted" based on the received participation request information, through a step similar to step S63-1. Then, the transmission and reception unit 51 of the control apparatus 50*x* transmits a terminal management table update request that includes the terminal ID of the terminal 10*cc* of the participation request source and the state information "accepted" that indicates the new state of the terminal 10*cc* of the participation request source, to the common management apparatus 60 (step S104-1).

When the transmission and reception unit 61 of the common management apparatus 60 has received the terminal management table update request, the storing and reading unit 69 of the common management apparatus 60 stores the terminal ID and the state information included in the terminal management table update request in the own terminal management table where the terminal ID is associated with the state information. Also, as a result of steps similar to steps S8-2-1, S8-2-3, . . . being carried out, the terminal management tables of the respective control apparatuses (50x, 50y, and 50z) are synchronized with the terminal management table of the common management apparatus 60.

Then, the management unit 53 of the control apparatus 50z manages information concerning the session sed established between the terminals (10aa, 10bb, and 10cc) (step S105-1). In this case, the transmission and reception unit 51 of the control apparatus 50z transmits a session management table update request that includes the session ID included in the participation request information and the terminal ID of the terminal 10cc of the participation request source, to the common management apparatus 60, based on a request from the management unit 53.

When the transmission and reception unit 61 of the common management apparatus 60 has received the session management table update request, the storing and reading unit 69 of the common management apparatus 60 stores the session ID and the terminal ID included in the session management table update request in the own session management table where the session ID is associated with the terminal ID. Thereafter, as a result of steps similar to steps S65-2-1, . . . being carried out, the session management tables in the respective control apparatuses (50x, 50y, and 50z) are synchronized with the session management table of the common management apparatus (steps S105-2-1, . . . ).

Then, the transmission and reception unit 51 of the control apparatus 50z transmits participation authorization information that indicates authorization of the terminal 10cc, from which the participation request has been transmitted, to participate in the session sed (step S106).

After the transmission and reception unit 11 of the terminal 10cc of participation request source receives the participation authorization information, the transmission and reception unit 11 transmits relay request information that indicates a request to start relaying content data to the control apparatus 50z (step S111). The relay request information includes the terminal ID of the terminal 10cc of the relay request source and the session ID "conf01.001xx" received in step S102.

When the transmission and reception unit 51 of the control apparatus 50z has received the relay request information, the management unit 53 of the control apparatus 50z determines state information that indicates a new state of the terminal 10cc of the relay request source as "busy" based on the received relay request information, through a step similar to step S63-1. Then, the transmission and reception unit 51 of the control apparatus 50z transmits a terminal management table update request that includes the terminal ID of the terminal 10cc of the relay request source and the state information "busy" that indicates the new state of the terminal 10cc to the common management apparatus 60 (step S112-1).

When the transmission and reception unit 61 of the common management apparatus 60 has received the terminal management table update request, the storing and reading unit 69 of the common management apparatus 60 stores the terminal ID and the state information included in the terminal management table update request in the own terminal management table where the terminal ID is associated with the state information. Then, as a result of steps similar to steps S8-2-1, S8-2-2, . . . being carried out, the terminal management tables of the respective control apparatuses (50x, 50y, and 50z) are synchronized with the terminal management table of the common management apparatus 60 (steps S112-2-1, S112-2-2, . . . ).

Then, the transmission and reception unit 51 of the control apparatus 50z transmits the relay request information transmitted from the terminal 10cc of the relay request source to the relay apparatus 30zz identified by the relay apparatus ID based on the relay apparatus ID "001zz" associated with the terminal ID of the terminal 10cc of relay request source in the terminal management table of the control apparatus 50z (step S113). Because the session ID "conf01.001xx" included in the relay request information includes the information "001xx" that indicates the relay apparatus 30xx as the starting point, the relay apparatus 30zz that receives the relay request information can know that the relay apparatus 30xx is the starting point in the session sed. Therefore, the transmission and reception unit 31 of the relay apparatus 30zz transmits the relay request information transmitted from the control apparatus 50z to the relay apparatus 30xx as the starting point (step S114).

The transmission and reception unit 31 of the relay apparatus 30xx responds to the relay request information, to transmit relay authorization information that indicates to authorize relaying to the relay apparatus 30zz (step S115).

The transmission and reception unit 31 of the relay apparatus 30zz responds to the relay request information, to transmit relay authorization information that indicates to authorize relaying to the control apparatus 50z (step S116).

When the transmission and reception unit 51 of the control apparatus 50z has received the relay authorization information transmitted from the relay apparatus 30zz, the transmission and reception unit 51 transmits the relay authorization information to the terminal 10cc of relay request source (step S117).

As a result of the transmission and reception unit 31 of the relay apparatus 30xx receiving the relay request information, the relay apparatus 30xx can know that the terminal 10cc connected with the relay apparatus 30zz will participate in the session identified by the session ID included in the relay request information. The relay apparatus 30xx determines a transmission route of content data based on the relay apparatuses 30 to which the terminals 10 that participate in the session sed are connected, and reports the determined transmission route to the relay apparatuses (30zz and 30yy).

For example, the relay apparatus 30xx transmits a request to transmit content data transmitted from the terminal 10cc to the relay apparatuses (30xx and 30yy), and transmits a request to transmit content data of the terminals (10aa and 10bb) transmitted from the relay apparatuses (30xx, 30yy) to the terminal 10cc, to the relay apparatus 30zz. Thus, the relay apparatus 30zz starts transmitting content data transmitted from the terminal 10cc to the relay apparatuses (30xx and 30yy), and also, starts transmitting content data of the terminals 10aa and 10bb transmitted from the relay apparatuses 30xx and 30yy to the terminal 10cc.

Also, the relay apparatus 30xx transmits a request that indicates to transmit content data transmitted from the terminal 10bb to the relay apparatus 30zz, and transmit content data of the terminal 10cc transmitted from the relay apparatus 30zz to the terminal 10bb, to the relay apparatus 30yy. Thus, the relay apparatus 30yy starts transmitting content data transmitted from the terminal 10bb to the relay apparatus 30zz, and also, starts transmitting content data of the terminal 10cc transmitted from the relay apparatus 30zz to the terminal 10bb.

Thus, the session sed is established also between the terminal 10cc and the relay apparatus 30zz, and between the relay apparatus 30zz and the relay apparatuses (30xx and 30yy).

When the session sed between the terminal 10cc and the relay apparatus 30zz, and between the relay apparatus 30zz and the relay apparatuses (30*xx* and 30*yy*) has been all established, the terminals (10*aa*, 10*bb*, and 10*cc*) can mutually transmit content data.

(8) Relay Apparatus Selection Flowchart

Figure 14:
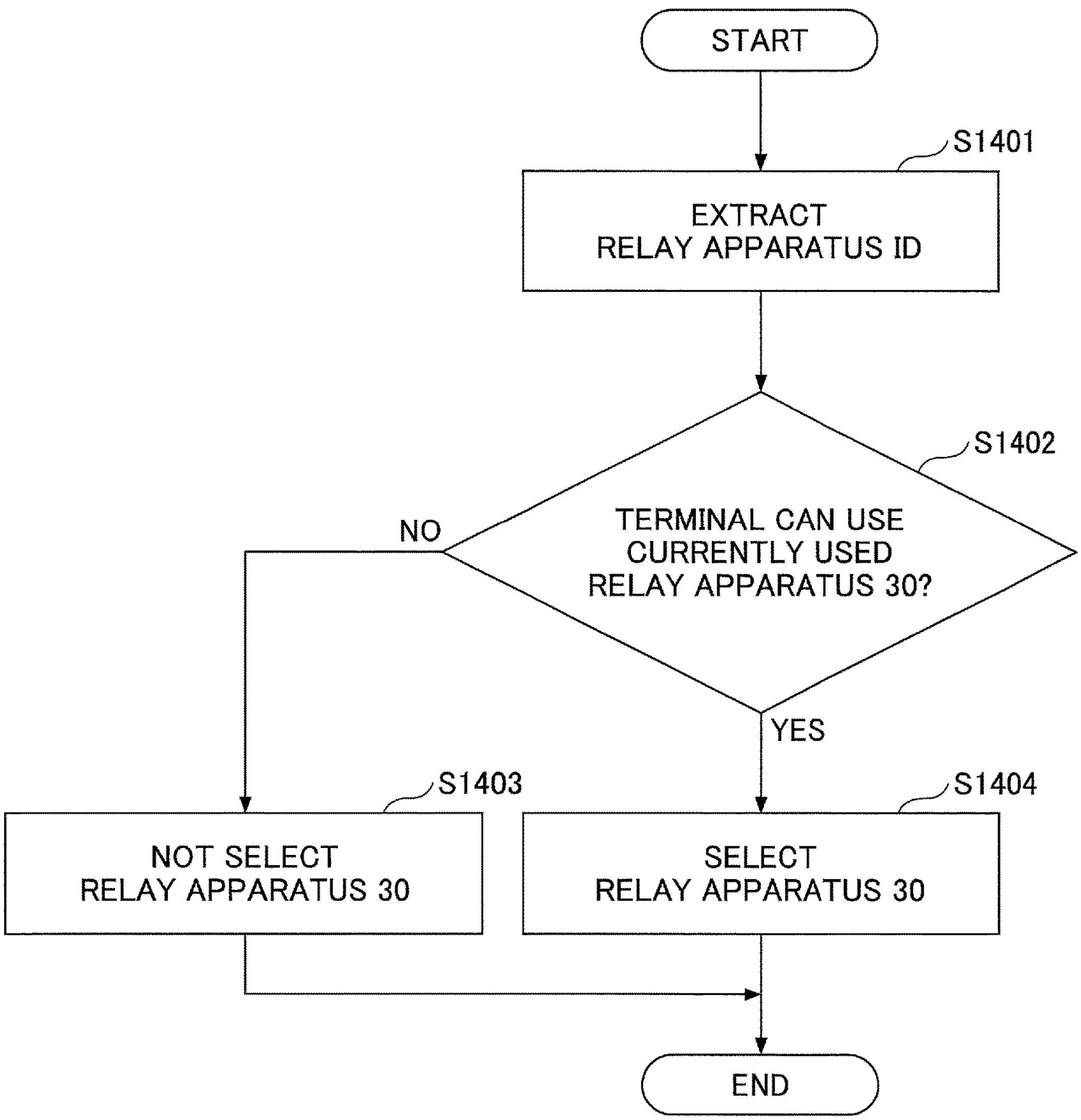
FIG. 14 is a flowchart illustrating one example of a method to select a relay apparatus according to the first embodiment.

FIG. 14 is a flowchart illustrating one example of a method for selecting a relay apparatus 30 according to the first embodiment. FIG. 14 illustrates a method to select a relay apparatus 30 for when the terminal 10*cc* newly participates in the session sed already established between the terminals 10*aa* and 10*bb*.

In step S1401, the relay apparatus selection unit 56 of the control apparatus 50 searches the session management table of the session management DB 5004 using the session ID included in the session participation request information from the terminal 10*cc* as a search key, to extract the relay apparatus ID. Below, the extracted relay apparatus 30 will be referred to as a "currently used relay apparatus 30".

Then, the relay apparatus selection unit 56 of the control apparatus 50 searches the attribute management table of the attribute management DB 5014 based on the terminal ID of the terminal 10*cc*, to extract a relay apparatus 30 that is included in an intranet 100 usable by the terminal 10*cc*.

In step S1402, the relay apparatus selection unit 56 of the control apparatus 50 determines whether the terminal 10*cc* can use the currently used relay apparatus 30.

Actually, the relay apparatus selection unit 56 of the control apparatus 50 determines whether the currently used relay apparatus 30 is the same as the relay apparatus 30 extracted as being able to be used by the terminal 10*cc*.

If these relay apparatuses are the same as one another, the relay apparatus selection unit 56 of the control apparatus 50 determines that the terminal 10*cc* can use the currently used relay apparatus 30 (YES in step S1402), and proceeds to step S1404.

If these relay apparatuses are different from one another, the relay apparatus selection unit 56 of the control apparatus 50 determines that it is not possible for the terminal 10*cc* to use the currently used relay apparatus 30 (NO in step S1402), and proceeds to step S1403.

One example of a method to determine whether the currently used relay apparatus 30 is included in the intranet 100 usable by the terminal 10*cc* will now be described.

That is, a method to determine, by the relay apparatus selection unit 56, whether the currently used relay apparatus 30 is included in the intranet 100 usable by the terminal 10*cc* for when a session has been established between the terminals 10*aa* and 10*bb* will now be described.

The relay apparatus selection unit 56 searches the attribute management table (FIG. 6H) based on the terminal ID of the terminal 10*aa* or 10*bb*. If the relay apparatus ID of the relay apparatus 30 extracted through the search is the same as the relay apparatus ID of the currently used relay apparatus 30, the relay apparatus selection unit 56 determines that a relay apparatus 30 included in the intranet 100 usable by the terminal 10*cc* is currently used.

The storage unit 5000 may store information as to whether the currently used relay apparatus 30 is included in the intranet 100 usable by the terminal 10*cc* in the relay apparatus management table (FIG. 6E), and the relay apparatus selection unit 56 may determine whether the currently used relay apparatus 30 is included in the intranet 100 usable by the terminal 10*cc* based on the information stored in the relay apparatus management table.

In step S1404, the relay apparatus selection unit 56 selects the currently used relay apparatus 30.

In step S1403, it is possible that the relay apparatus selection unit 56 does not select a relay apparatus 30. If so, the transmission and reception unit 51 of the control apparatus 50 may report to the terminal 10*cc* that it is not possible for the terminal 10*cc* to participate in the session sed established between the terminals 10*aa* and 10*bb*. The display control unit 17 of the terminal 10*cc* that has received the report may display on the display 109 that it is not possible to participate in the session sed.

In step S1403, the relay apparatus selection unit 56 may search the attribute management table based on the terminal ID of the terminal 10*cc*, to select a relay apparatus 30 that is included in the intranet 100 usable by the terminal 10*cc*. Because it is possible to reduce the information leakage risk if the terminal 10*cc* can use the relay apparatus 30 included in the intranet 100, the control apparatus 50 may determine to authorize participation of the terminal 10*cc* in the session sed.

Also, in step S1403, the relay apparatus selection unit 56 may newly select a relay apparatus 30 included in the Internet such that all the terminals 10 which request to participate in the session sed can participate in a video conference. In this case, all the terminals 10 which have participated in the already established session sed carry out processes to connect to the newly selected relay apparatus 30. Actually, these terminal 10 carry out the processes described in FIGS. 10-14 again.

Note that, as described above, a terminal 10 is portable. Therefore, also when a terminal 10 will participate in an established session sed, the display control unit 17 and the reception unit 12 of the terminal 10 may carry out processes to urge the user to determine whether to participate in the established session sed using a relay apparatus 30 included in an intranet 100.

(9) Session Exiting Sequence

Figure 15A:
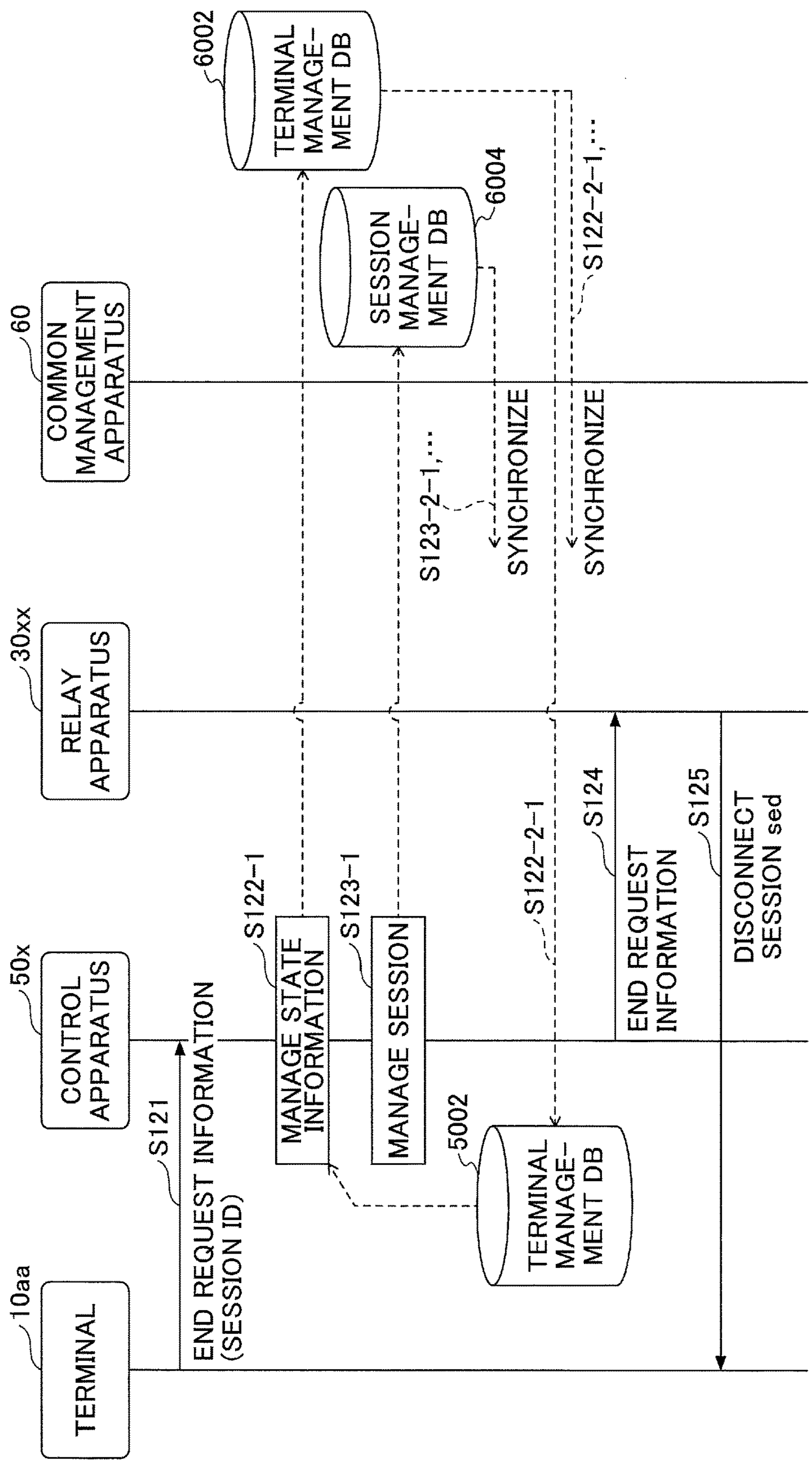
FIGS. 15A and 15B are sequence diagrams illustrating one example of a process of a terminal to exit a session according to the first embodiment.
Figure 15B:
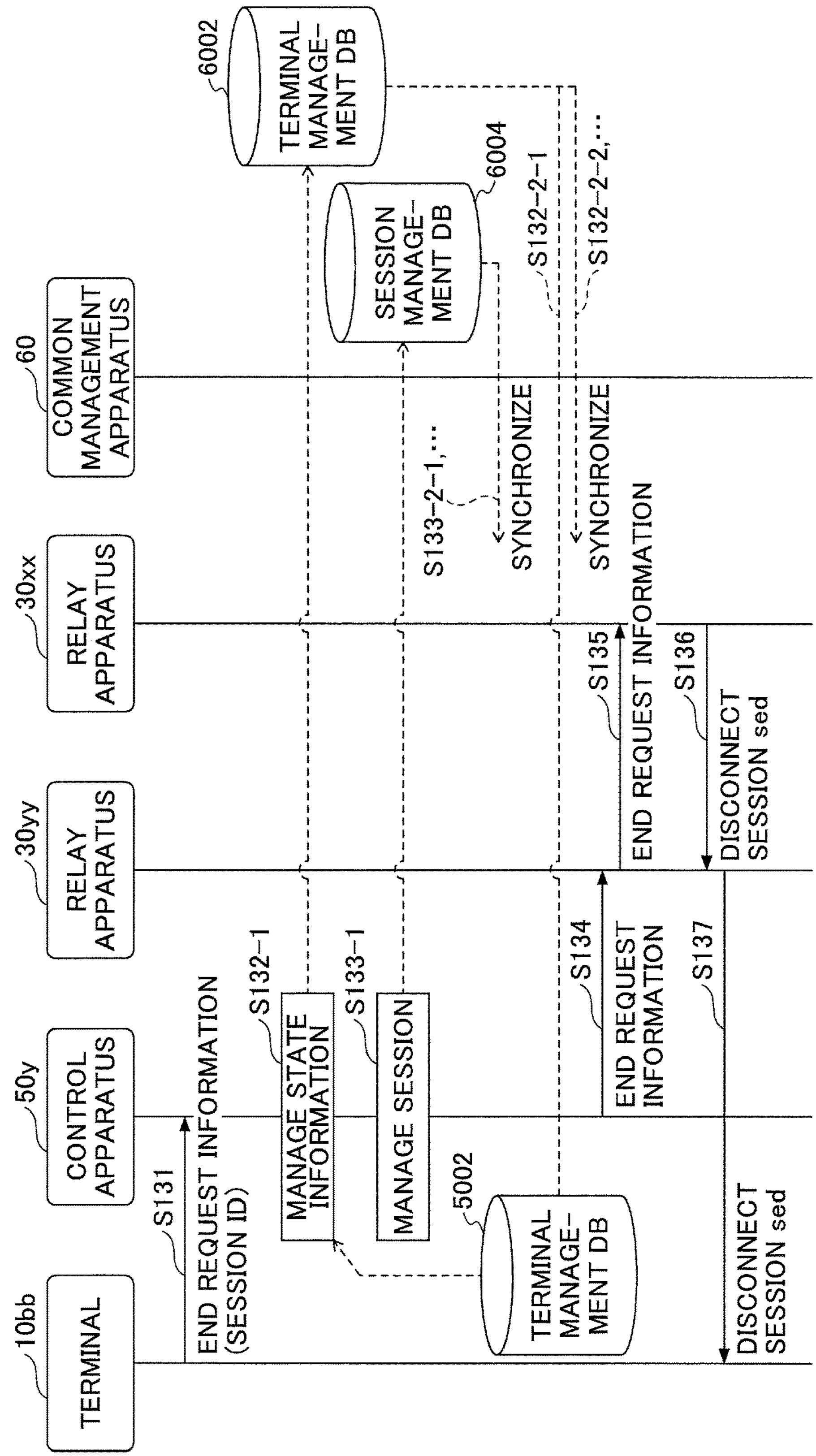

FIGS. 15A and 15B are sequences illustrating an example of a process to exit a session by a terminal 10 according to the first embodiment.

With reference to FIG. 15A, a process for the terminal 10*aa* having participated in a session sed established between the terminals (10*aa*, 10*bb*, and 10*cc*) to exist the session will be described.

The transmission and reception unit 11 of the terminal 10*aa* transmits an end request information that indicates to end the communications to the control apparatus 50*x* based on the user's request (step S121). The end request information includes the session ID of the session sed "conf01.001xx" in which the terminal 10*aa* has participated.

When the transmission and reception unit 51 of the control apparatus 50*x* has received the end request information, the management unit 53 of the control apparatus 50*x* determines state information that indicates a new state of the terminal 10*aa* as "none" based on the received end request information, through a step similar to step S63-1. Then, the transmission and reception unit 51 of the control apparatus 50*x* transmits a terminal management table update request that includes the terminal ID of the terminal 10*aa* of the end request source and the state information "none" that indicates the new state of the terminal 10*aa* to the common management apparatus 60 (step S122-1).

When the transmission and reception unit 61 of the common management apparatus 60 has received the terminal management table update request, the storing and reading unit 69 of the common management apparatus 60 stores the terminal ID and the state information included in the terminal management table update request in the own terminal management table where the terminal ID is associated with the state information. Also, as a result of steps similar to steps S8-2-1, S8-2-2, . . . being carried out, the terminal management tables of the respective control apparatuses (50*x*, 50*y*, and 50*z*) are synchronized with the terminal management table of the common management apparatus 60 (steps S122-2-1, S122-2-2, . . . ).

Then, the management unit 53 manages information concerning the session sed that the terminal 10*aa* will exit (step S123-1). In this case, the transmission and reception unit 51 transmits a session management table update request that includes the session ID included in the end request information and the terminal ID of the terminal 10*aa* that will exit the session sed to the common management apparatus 60, based on a request from the management unit 53.

When the transmission and reception unit 61 of the common management apparatus 60 has received the session management table update request, the storing and reading unit 69 of the common management apparatus 60 deletes the terminal ID of the terminal 10*aa* associated with the session ID included in the session management table update request from the own session management table. Thereafter, as a result of steps similar to steps S65-2-1, . . . being carried out, the terminal management tables of the respective control apparatuses (50*x*, 50*y*, and 50*z*) are synchronized with the session management table of the common management apparatus 60 (steps S123-2-1, . . . ).

Then, the transmission and reception unit 51 of the control apparatus 50*x* transmits the end request information transmitted from the terminal 10*aa* of the end request source to the relay apparatus 30*xx* identified by the relay apparatus ID "001xx" associated with the terminal ID of the terminal 10*aa* of the end request source in the own terminal management table (step S124).

As a result of the transmission and reception unit 31 of the relay apparatus 30*xx* receiving the end request information, the relay apparatus 30*xx* can know that the terminal 10*aa* will exit the session sed established between the terminals (10*aa*, 10*bb*, and 10*cc*). The relay apparatus 30*xx* determines a content data transmission route based on the relay apparatuses 30 to which the terminals (10*bb* and 10*cc*) that are still participating in the session sed that the terminal 10*aa* has exited is connected, and reports the transmission route to the relay apparatuses (30*yy* and 30*zz*). For example, the relay apparatus 30*xx* transmits a request to transmit content data transmitted from the terminal 10*bb* to the relay apparatus 30*zz*, and transmits a request to transmit content data of the terminal 10*cc* transmitted from the relay apparatus 30*zz* to the terminal 10*bb*, to the relay apparatus 30*yy*. Also, the relay apparatus 30*xx* transmits a request that indicates to transmit content data transmitted from the terminal 10*cc* to the relay apparatus 30*yy*, and transmit content data of the terminal 10*bb* transmitted from the relay apparatus 30*yy* to the terminal 10*cc*, to the relay apparatus 30*zz*.

Then, the terminal 10*aa* disconnects from the session sed (step S125), and the terminals (10*bb*, 10*cc*) can continue to mutually transmit content data.

With reference to FIG. 15B, a process for, after the terminal 10*aa* exits the session sed, the terminal 10*bb* to exit the session sed established between the terminals (10*bb* and 10*cc*) will be described. First, the transmission and reception unit 11 of the terminal 10*bb* transmits end request information that indicates to end the communications to the control apparatus 50*y*, based on the user's request (step S131). The end request information includes the session ID of the session sed "conf01.001xx" in which the terminal 10*bb* is participating.

When the transmission and reception unit 51 of the control apparatus 50*y* has received the end request information, the management unit 53 of the control apparatus 50*y* determines state information that indicates a new state of the terminal 10*bb* as "none" based on the received end request information, through a step similar to step S63-1. Then, the transmission and reception unit 51 of the control apparatus 50*y* transmits a terminal management table update request that includes the terminal ID of the terminal 10*bb* of the end request source and the state information "none" that indicates the new state of the terminal 10*bb* to the common management apparatus (step S132-1).

When the transmission and reception unit 61 of the common management apparatus 60 has received the terminal management table update request, the storing and reading unit 69 of the common management apparatus 60 stores the terminal ID and the state information included in the terminal management table update request in the own terminal management table where the terminal ID is associated with the state information. Thereafter, as a result of steps similar to steps S8-2-1, S8-2-2, . . . being carried out, the terminal management tables of the respective control apparatuses (50*x*, 50*y*, and 50*z*) are synchronized with the terminal management table of the common management apparatus 60 (steps S132-2-1, S132-2-2, . . . ).

Then, the management unit 53 manages information concerning the session sed that the terminal 10*bb* will exit (step S133-1). In this case, the transmission and reception unit 51 transmits a session management table update request that includes the session ID included in the end request information and the terminal ID of the terminal 10*bb* that will exit the session sed to the common management apparatus 60 based on a request from the management unit 53.

When the transmission and reception unit 61 of the common management apparatus 60 has received the session management table update request, the storing and reading unit 69 of the common management apparatus 60 deletes the terminal ID of the terminal 10*bb* associated with the session ID included in the session management table update request from the own session management table. Thereafter, as a result of steps similar to steps S65-2-1, . . . being carried out, the terminal management tables of the respective control apparatuses (50*x*, 50*y*, and 50*z*) are synchronized with the session management apparatus 60 (steps S133-2-1, . . . ).

Then, the transmission and reception unit 51 of the control apparatus 50*y* transmits the end request information transmitted from the terminal 10*bb* of the end request source to the relay apparatus 30*yy* identified by the relay apparatus ID "001yy" associated with the terminal ID of the terminal 10*bb* of the end request source in the terminal management table of the control apparatus 50*y* (step S134). Because the session ID "conf01.001xx" included in the end request information includes the information "001xx" that indicates the relay apparatus 30*xx* as the starting point, the relay apparatus 30*yy* that has received the relay request information can know that, in the session sed, the relay apparatus 30*xx* is the starting point. Therefore, the transmission and reception unit 31 of the relay apparatus 30*yy* transmits the end request information transmitted from the control apparatus 50*y* to the relay apparatus 30*xx* as the starting point (step S135).

As a result of the transmission and reception unit 31 of the relay apparatus 30*xx* receiving the end request information, the relay apparatus 30*xx* can know that the terminal 10*bb* will exit the session sed established between the terminals (10*bb* and 10*cc*). The relay apparatus 30*xx* determines a content data transmission route based on the relay apparatus 30 to which the terminal 10*cc* that is still participating in the session sed that the terminal 10*aa* has exited is connected, and reports the transmission route to the relay apparatuses (30*yy* and 30*zz*). For example, the relay apparatus 30*xx* transmits a request to disconnect the session sed between the relay apparatus 30*yy* and the terminal 10*bb* and between the relay apparatus 30*yy* and the relay apparatus 30*zz*, to the relay apparatus 30*yy*. Also, the relay apparatus 30*xx* transmits a request to return content data transmitted from the terminal 10*cc* to the terminal 10*cc*, to the relay apparatus 30*zz*. Thus, the terminal 10*bb* disconnects from the session sed (step S137), and the terminal 10*cc* can continue the session sed to receive content data transmitted from the terminal 10*cc* itself via the relay apparatus 30*zz*.

(10) Logout Sequence

Figure 16:
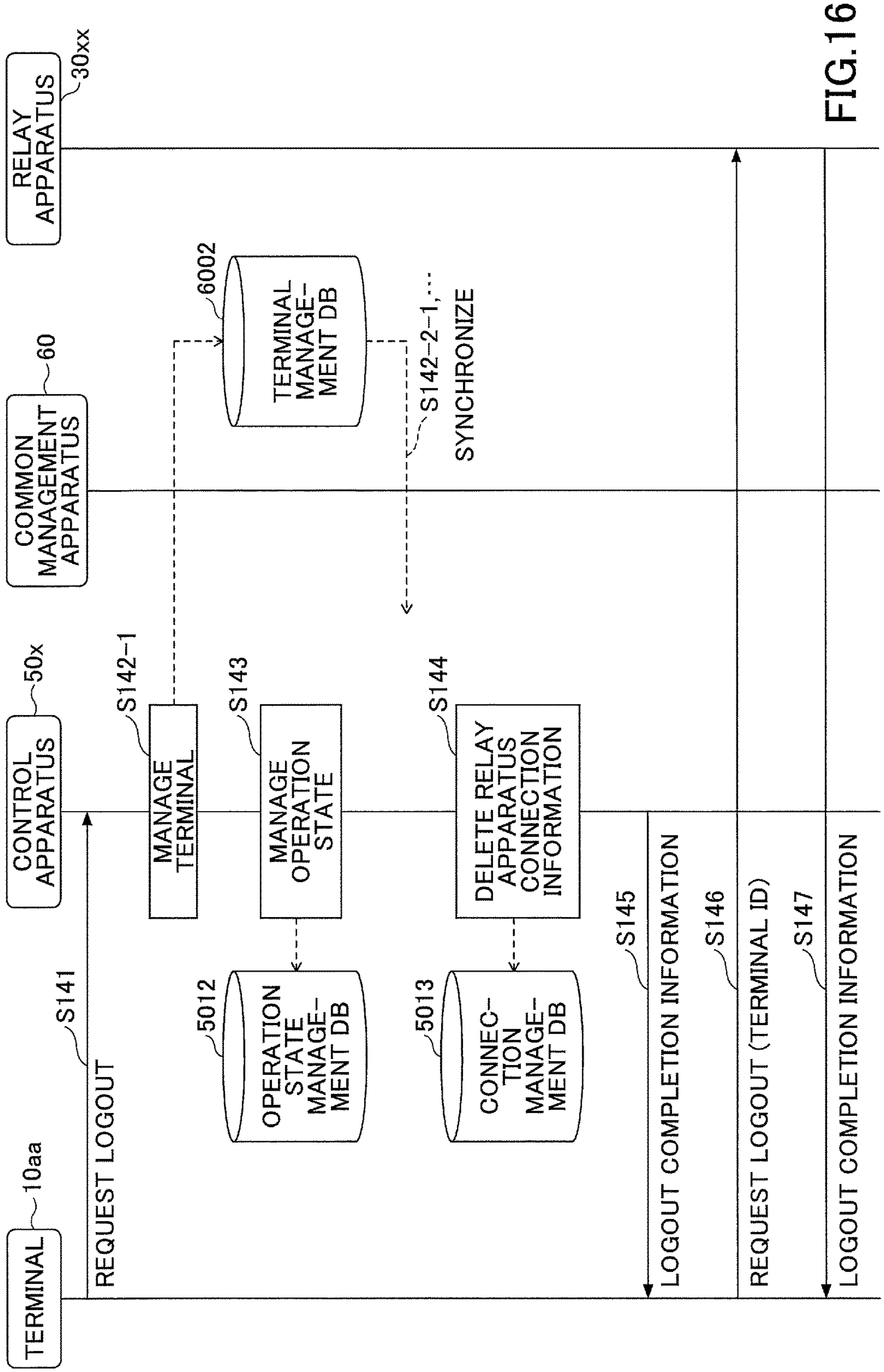
FIG. 16 is a sequence diagram illustrating one example of a process of a terminal to logout according to the first embodiment.

FIG. 16 is a sequence diagram illustrating one example of a logout process of a terminal 10 according to the first embodiment. Below, a process of the terminal 10*aa* to logout from the control apparatus 50*x* after exiting the session sed established between the terminals (10*bb* and 10*cc*) will be described.

The terminal 10*aa* transmits a logout request to the control apparatus 50*x* to which the terminal 10*aa* is connected through the transmission and reception unit 11 based on the user's request (step S141). When the transmission and reception unit 51 of the control apparatus 50*x* has received the logout request, the transmission and reception unit 51 transmits a request to delete the area ID, the IP address, and the relay apparatus ID associated with the terminal ID of the terminal 10*aa* that will logout from the own terminal management table to the common management apparatus 60 based on a request from the management unit 53 (step S142-1).

When the transmission and reception unit 61 of the common management apparatus 60 has received the request, the storing and reading unit 69 of the common management apparatus 60 delates the area ID, the IP address, and the relay apparatus ID associated with the received terminal ID from the own terminal management table. Thereafter, as a result of steps similar to steps S8-2-1, S8-2-2, . . . being carried out, the terminal management tables of the respective control apparatuses (50*x*, 50*y*, and 50*z*) are synchronized with the terminal management table of the common management apparatus 60 (steps S142-2-1, . . . ).

Then, the storing and reading unit 59 of the control apparatus 50*x* stores the operation state "offline" in the own operation state management table where the operation state is associated with the terminal ID of the terminal 10*aa* of the logout request source based on a request from the management unit 53 (step S143).

Also, the management unit 53 of the control apparatus 50*x* deletes the record corresponding to the terminal ID of the terminal 10*aa* of the logout request source from the own connection management table (step S144).

Thus, the terminal ID of the terminal 10*aa*, and the relay apparatus connection ID and the relay apparatus connection password associated with the terminal ID are deleted from the connection management table of the control apparatus 50*x*.

Then, the transmission and reception unit 51 of the control apparatus 50*x* transmits logout completion information that indicates that the logout has been completed to the terminal 10*aa* of the logout request source (step S147).

Also, the terminal 10*aa* transmits a logout request to the relay apparatus 30*xx*. The relay apparatus 30*xx* transmits logout completion information to the terminal 10*aa* when the logout of the terminal 10*aa* has been completed in response to the logout request.

Thus, the terminal 10*aa* completes logout from the control apparatus 50*x* and the relay apparatus 30*xx*.

According to the embodiments described above, it is possible to transmit and receive content data through a safe and proper route in a communications system.

[Others]

The communications system 1 is one example of a communications control system. The relay apparatus selection unit 56 is one example of a unit carrying out a selecting operation. The transmission and reception unit 51 is one example of a unit carrying out a receiving operation and a unit carrying out a transmitting operation. Also, the reception unit 12 and the display control unit 17 are examples of a unit carrying out an inputting operation and a unit carrying out an outputting operation. The transmission and reception unit 11 is one example of a unit carrying out a transmitting operation.

Recording media that store software program codes to implement the functions of the above-described embodiments may be provided to the control apparatuses 50 and the terminals 10. As a result of the control apparatuses 50 and the terminals 10 then executing the program codes, the above-described embodiments are implemented. In this case, the program codes themselves that are read from the recording media implement the functions of the above-described embodiments, and the recording media storing the program codes implement any embodiments. The recording media are recording media or non-transitory recording media.

The functions of the above-described embodiments are implemented not only as a result of a computer reading and executing the program codes but also as a result of an operating system (OS) or the like operating in a computer carrying out some or all of the actual processes according to the instructions of the program codes. Also, the functions of the above-described embodiments may be implemented by these processes.

Thus, the control apparatuses, the communications control systems, and the non-transitory recording media have been described in the embodiments. However, embodiments are not limited to the above-described embodiments, and various modifications and replacements may be made.

What is claimed is:

1. A control apparatus comprising:

a network interface;

a storage unit, and at least one processor configured to:

receive, through a network interface, a request from a first communications terminal from among a plurality of communications terminals to start a communication between the first communications terminal and a second communications terminal and select one or more relay apparatuses that relay content data transmitted and received between the first communications terminal and the second communications terminal from among the communications terminals, said one or more relay apparatuses including a first relay apparatus that belongs to a first intranet and a second relay apparatus that belongs to a second intranet that is connected to the first intranet via a network that is not an intranet;

search for one or more relay apparatuses that are included in intranets and usable for the communication between the first communications terminal and the second communications terminal;

select, based on a result of the search, the first and second relay apparatuses included in the first and second intranets usable by the first communications terminal and the second communications terminal in response to the received request; and transmit, through the network interface, identification information of the selected first and second relay apparatuses to the first communications terminal from which the request was received, wherein the at least one processor is further configured to:

instruct the first and second relay apparatuses to directly communicate to each other, thereby performing the communication between the first communications terminal and the second communications terminal.

2. The control apparatus according to claim 1, wherein the at least one processor is further configured to:

read information stored in a storage unit where relay apparatuses respectively usable by the communications terminals are associated with identifiers of networks in which the relay apparatuses are included, and select the one or more relay apparatuses included in the one or more networks in which the first communications terminal and the second communications terminal are included.

3. The control apparatus according to claim 2, wherein the at least one processor is further configured to:

store network addresses as the identifiers of the networks.

4. The control apparatus according to claim 1, wherein the at least one processor is further configured to:

select a second relay apparatus included in a second network of the second communications terminal for the first communications terminal if a first relay apparatus included in a first network other than the second network of the second communications terminal has been already selected for the first communications terminal.

5. The control apparatus according to claim 1, wherein the at least one processor is further configured to:

select a first relay apparatus included in a first network for transmitting content data to and receiving content data from the first communications terminal, and a second relay apparatus included in a second network for transmitting content data to and receiving content data from the second communications terminal, if the first communications terminal is included in the first network to which access from outside of the first network is restricted, and the second communications terminal is included in the second network to which access from outside of the second network is restricted, and wherein the content data is transmitted and received between the first communications terminal and the second communications terminal via the first relay apparatus and the second relay apparatus.

6. The control apparatus according to claim 1, wherein the at least one processor is further configured to select a same relay apparatus located in one of the intranets when the first and the second communications terminals are located in the one of the intranets.

7. The control apparatus according to claim 1, wherein the at least one processor is configured to select, based on the search result, only the first and second relay apparatuses included in the intranets usable by the first communications terminal and the second communications terminal in response to the received request.

8. The control apparatus according to claim 7, wherein the content data transmitted and received between the first communications terminal and the second communications terminal is kept within the first and second intranets during the communication.

9. A communications control system comprising:

a plurality of communications terminals; and a control apparatus, wherein a first communications terminal from among the communications terminals comprises at least one processor configured to:

transmit a request to start a communication between the first communications terminal and a second communications terminal and select one or more relay apparatuses that relay content data transmitted and received between the first communications terminal and the second communications terminal from among the communications terminals, and the control apparatus comprises:

a network interface;

a storage unit, and at least one processor configured to:

receive, through a network interface, a request from a first communications terminal from among a plurality of communications terminals to start a communication between the first communications terminal and a second communications terminal and select one or more relay apparatuses that relay content data transmitted and received between the first communications terminal and the second communications terminal from among the communications terminals, said one or more relay apparatuses including a first relay apparatus that belongs to a first intranet and a second relay apparatus that belongs to a second intranet that is connected to the first intranet via a network that is not an intranet;

search for one or more relay apparatuses that are included in intranets and usable for the communication between the first communications terminal and the second communications terminal;

select, based on a result of the search, the first and second relay apparatuses included in the first and second intranets usable by the first communications terminal and the second communications terminal in response to the received request; and transmit, through the network interface, identification information of the selected first and second relay apparatuses to the first communications terminal from which the request was received, wherein the at least one processor is further configured to:

instruct the first and second relay apparatuses to directly communicate to each other, thereby performing the communication between the first communications terminal and the second communications terminal.

10. The communications control system according to claim 9, wherein the at least one processor of the first communications terminal is further configured to:

display the identification information of the one or more relay apparatuses received from the control apparatus, and receive an input from a user to select at least one of the one or more relay apparatus.

11. A non-transitory recording medium storing a program which, when executed by one or more processors, causes the one or more processors to:

receive, through a network interface, a request from a first communications terminal from among a plurality of communications terminals to start a communication between the first communications terminal and a second communications terminal and select one or more relay apparatuses that relay content data transmitted and received between the first communications terminal and the second communications terminal from among the communications terminals, said one or more relay apparatuses including a first relay apparatus that belongs to a first intranet and a second relay apparatus that belongs to a second intranet that is connected to the first intranet via a network that is not an intranet;

search for one or more relay apparatuses that are included in intranets and usable for the communication between the first communications terminal and the second communications terminal;

select, based on a result of the search, the first and second relay apparatuses included in the first and second intranets usable by the first communications terminal and the second communications terminal in response to the received request; and transmit, through the network interface, identification information of the selected first and second relay apparatuses to the first communications terminal from which the request was received, wherein the at least one processor is further configured to:

instruct the first and second relay apparatuses to directly communicate to each other, thereby performing the communication between the first communications terminal and the second communications terminal.

* * * * *